US008489309B2

(12) United States Patent
Nakayama

(10) Patent No.: US 8,489,309 B2
(45) Date of Patent: Jul. 16, 2013

(54) FEEDBACK CONTROL SYSTEM

(75) Inventor: Shigeki Nakayama, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 905 days.

(21) Appl. No.: 12/601,424

(22) PCT Filed: May 22, 2008

(86) PCT No.: PCT/JP2008/059860

§ 371 (c)(1),
(2), (4) Date: Nov. 23, 2009

(87) PCT Pub. No.: WO2008/143363

PCT Pub. Date: Nov. 27, 2008

(65) Prior Publication Data

US 2010/0174471 A1 Jul. 8, 2010

(30) Foreign Application Priority Data

May 24, 2007 (JP) ................................ 2007-138269

(51) Int. Cl.
*B60T 7/12* (2006.01)
*G05D 1/00* (2006.01)
*G06F 7/00* (2006.01)
*G06F 17/00* (2006.01)
*F02D 41/00* (2006.01)

(52) U.S. Cl.
USPC ............ 701/109; 123/696; 123/698; 701/108

(58) Field of Classification Search
USPC ............... 123/568.11, 568.21, 672, 679, 696, 123/698; 701/77, 102, 108, 109
See application file for complete search history.

(56) References Cited

U.S. PATENT DOCUMENTS

| | | | | |
|---|---|---|---|---|
| 5,724,952 | A * | 3/1998 | Miyashita et al. | 123/688 |
| 5,954,039 | A * | 9/1999 | Doering et al. | 123/692 |
| 7,086,382 | B2 * | 8/2006 | Daniels et al. | 123/406.23 |
| 7,270,119 | B2 * | 9/2007 | Mitsutani | 123/674 |
| 2002/0129800 | A1 * | 9/2002 | Russell et al. | 123/568.16 |
| 2004/0065303 | A1 * | 4/2004 | Russell et al. | 123/480 |

FOREIGN PATENT DOCUMENTS

| | | | |
|---|---|---|---|
| JP | 04-148401 | A | 5/1992 |
| JP | 2004-086858 | A | 3/2004 |
| JP | 2006-161605 | A | 6/2006 |
| JP | 2006-249962 | A | 9/2006 |
| JP | 2007-087367 | A | 4/2007 |

* cited by examiner

*Primary Examiner* — Stephen K Cronin
*Assistant Examiner* — Sizo Vilakazi
(74) *Attorney, Agent, or Firm* — Sughrue Mion, PLLC

(57) ABSTRACT

In a feedback control system in which a base gain having a constant value or a variable gain is set as a feedback gain in accordance with the state of the system and an input value is calculated based on a function having, as variables, a proportional term and an integral term, the integral term is recalculated when a discriminant value obtained by substituting a base proportional term calculated using the base gain for the proportional term and a normal integral term calculated using the feedback gain for the integral term in the function is larger than an upper limit value. The integral term is recalculated in such a way that a value obtained by substituting the base proportional term for the proportional term and the recalculated integral term for the integral term in the function becomes equal to or smaller than the upper limit value.

17 Claims, 10 Drawing Sheets

FEEDBACK CONTROL SYSTEM

This application is the national phase application under 35 U.S.C. §371 of PCT international application No. PCT/JP2008/059860 filed on 22 May 2008, which claims priority to Japanese patent application No. 2007-138269 filed on 24 May 2007, the contents of which are incorporated herein by reference.

TECHNICAL FIELD

The present invention relates to a feedback control system.

BACKGROUND ART

There has been known a technology in which a variable value that changes depending on a state of a control system is used as a feedback gain in a feedback control so that the approximation of an output value to a set point and/or the stability of the feedback control is improved. For example, Japanese Patent Application Laid-Open No. 2006-161605 discloses a technology of an EGR control apparatus in which the EGR amount of an internal combustion engine is feedback controlled, wherein when the internal combustion engine shifts from a transitional state to a stationary state, a control gain is gradually decreased to thereby stabilize the control of the EGR amount. Japanese Patent Application Laid-Open No. 2006-249962 discloses a technology of an EGR control apparatus in which the EGR amount of an internal combustion engine is feedback controlled, wherein a control gain is changed according to whether the error between a target EGR rate and the actual EGR rate is positive or negative, to thereby stabilize the control of the EGR rate.

DISCLOSURE OF THE INVENTION

In the feedback control, if an input value supplied to a controlled object is too large (or too small), hunting or overshooting will be caused, and the controllability is deteriorated. In order to prevent this from occurring, there is performed, in some cases, a guard process in which an upper limit value (or a lower limit value) is set for the input value, and if a calculated input value is larger than the upper limit value (or smaller than the lower limit value), the input value for the controlled object is set to a specific value that is equal to or smaller than the upper limit value (or a specific value that is equal to or larger than the lower limit value).

In a feedback control using a PI control or a PID control, when a calculated input value is too large (or too small), the proportional term, the integral term, and the derivative term are also considered to be too large (or too small). In cases where the integral term, among others, is too large (or too small), recalculation of the integral term is performed in some cases so that the integral term assumes appropriate values subsequently, because the value of the integral term at a certain time affects values of the integral term calculated subsequently and, in addition, values of the input value.

FIG. 9 shows, by way of example, a guard process and recalculation of the integral term in a PI control. FIG. 9(A) is a graph showing changes in the set point and the output value. FIG. 9(B) is a graph showing changes in the proportional term, the integral term, and the input value. The hatched portions represent the proportional term $U_p$, and the solid black portions represent the integral term $U_i$. Here, it is assumed that the input value for the controlled object is calculated as the sum of the proportional term $U_p$ and the integral term $U_i$. FIG. 9(C) is a graph showing changes in the ratio of the control gain to a base gain. In this exemplary case, it is assumed that the feedback gain is always constant and equal to the base gain. In other words, the ratio of the feedback gain to the base gain is constantly equal to 1.0 irrespective of the state of the control system.

As shown in FIG. 9(A), when the set point changes at a time between time $t_1$ and time $t_2$, the error between the output value and the set point increases, and the proportional term $U_p(t_2)$ and the integral term $U_i(t_2)$ at time $t_2$ have values larger than the proportional term $U_p(t_1)$ and the integral term $U_i(t_1)$ at time $t_1$ respectively as shown in FIG. 9(B). When the input value $U_p(t_2)+U_i(t_2)$ calculated from the proportional term $U_p(t_2)$ and the integral term $U_i(t_2)$ exceeds an upper limit value) $X_{sup}$ as shown in FIG. 9(B), the aforementioned guard process is performed, and in this case the upper limit value $X_{sup}$ is set as the input value for the controlled object. In the drawing, the input value at a stage before the guard process is performed is labeled as "PROVISIONAL INPUT VALUE".

At this time, recalculation of the integral term is performed simultaneously. Here, the integral term is calculated as a value obtained by subtracting the proportional term $U_p(t_2)$ from the upper limited value $X_{sup}$, namely the integral term after recalculation is:

$$U_{ical}(t_2)=X_{sup}-U_p(t_2).$$

The integral term $U_i(t_3)$ at time $t_3$ is calculated based on the integral term $U_{ical}(t_2)$ recalculated at time $t_2$. Specifically, it is calculated by adding the time integral of the error from time $t_2$ to time $t_3$ to the integral term $U_{ical}(t_2)$ recalculated at time $t_2$. Thus, while the value of the integral term becomes larger, the value of the proportional term $U_p(t_3)$ becomes smaller than the value of the proportional term $U_p(t_2)$ at time $t_2$ with a decrease in the error. If the provisional input value $U_p(t_3)+U_i(t_3)$ calculated from the proportional term $U_p(t_3)$ and the integral term $U_i(t_3)$ is substantially equal to the upper limit value $X_{sup}$ as shown in FIG. 9(B), neither the guard process nor recalculation of the integral term is performed, and the provisional input value is used, without a change, as the input value for the controlled object.

At time $t_4$, while the value of the proportional term $U_p(t_4)$ becomes further smaller with a further decrease in the error, the integral term $U_i(t_4)$ becomes a little larger than the integral term $U_i(t_3)$ at time $t_3$. If the provisional input value $U_p(t_4)+U_i(t_4)$ calculated from the proportional term $U_p(t_4)$ and the integral term $U_i(t_4)$ is smaller than the upper limit value $X_{sup}$ as shown in FIG. 9(B), neither the guard process nor recalculation of the integral term is performed, and the provisional input value is used, without a change, as the input value for the controlled object as with the case at aforementioned time $t_3$.

In this way, soon after the change in the set point, the output value gradually approaches the set point, while the input value is kept close to the upper limit value $X_{sup}$.

In the meantime, when the set point changes, it is effective in improving the approximation of the output value to the set point to temporarily set the feedback gain to a value that is larger than that in the stationary state. However, if the above described guard process and recalculation of the integral term are performed in a feedback control that uses such a variable value as the feedback gain, an appropriate input value cannot be obtained by calculation in some cases, and the stability of the feedback control may be deteriorated on the contrary. This will be described with reference to FIG. 10.

FIG. 10 shows, by way of example, a guard process and recalculation of the integral term in a PI control that uses a variable value as the feedback gain. In this exemplary case, as shown in FIG. 10(C), the feedback gain is constant and equal to a base gain during a stationary period in which the set point does not change, and when the set point changes, the feedback gain is a variable value that temporarily changes to a value larger than the base gain and decays toward a value equal to the base gain with a certain time constant.

When the set point changes at a time between time $t_1$ and time $t_2$ as shown in FIG. 10(A), a variable value as described above is set as the feedback gain. As shown in FIG. 10(C), the feedback gain at time $t_2$ soon after the change of the set point is set to be a value much larger than the base gain. In consequence, the proportional term $U_{pvar}(t_2)$ and the integral term $U_{ivar}(t_2)$ at time $t_2$ become much larger than the proportional term $U_{pbase}(t_1)$ and the integral term $U_{ibase}(t_1)$ calculated with the base gain at time $t_1$.

Here, the suffix "var" indicates that the value with this suffix is calculated using a variable gain as the feedback gain. The suffix "base" indicates that the value with this suffix is calculated using the base gain as the feedback gain.

When the provisional input value $U_{pvar}(t_2)+U_{ivar}(t_2)$ calculated from the proportional term $U_{pvar}(t_2)$ and the integral term $U_{ivar}(t_2)$ becomes larger than the upper limit value $X_{sup}$ as shown in FIG. 10(B), the aforementioned guard process is performed, and the upper limit value $X_{sup}$ is set as the input value for the controlled object as with the case shown in FIG. 9.

In this case, recalculation of the integral term is performed as with the case shown in FIG. 9. Specifically, the integral term is calculated as a value obtained by subtracting the proportional term $U_{pvar}(t_2)$ from the upper limit value $X_{sup}$, namely the integral term after recalculation is as follows:

$$U_{ical}(t_2)=X_{sup}-U_{pvar}(t_2).$$

Here, since the proportional term $U_{pvar}(t_2)$ calculated using the variable gain is a very large value, the integral term $U_{ical}(t_2)$ recalculated in the above described way will become much smaller than the integral term $U_{ivar}(t_2)$ before the recalculation.

The integral term $U_{ivar}(t_3)$ at time $t_3$ is calculated based on the integral term $U_{ical}(t_2)$ recalculated at time $t_2$. Specifically, it is calculated by adding the time integral of the error from time $t_2$ to time $t_3$ to the integral term $U_{ical}(t_2)$ recalculated at time $t_2$. Since the value of the integral term $U_{ical}(t_2)$ has been greatly decreased by the recalculation, and the variable gain decays to a value close to the base gain over the period from time $t_2$ to time $t_3$, the integral term $U_{ivar}(t_3)$ at time $t_3$ is unlikely to become larger than the integral term $U_{ivar}(t_2)$ at time $t_2$. In addition, since the variable gain decays, the proportional term $U_{pvar}(t_3)$ at time $t_3$ will not be a very large value unlike with the proportional term $U_{pvar}(t_2)$ at time $t_2$. Therefore, there is a possibility that the input value $U_{pvar}(t_3)+U_{ivar}(t_3)$ calculated from the integral term $U_{ivar}(t_3)$ and the proportional term $U_{pvar}(t_3)$ does not have a value large enough to decrease the error between the output value and the set point at time $t_3$. If this is the case, the output value changes away from the set point after time $t_3$ as shown in FIG. 10(A).

The proportional term and the integral term at time $t_4$ become larger with an increase in the error after time $t_3$. Then, the output value after time $t_4$ will gradually approach the set point again as shown in FIG. 10(A).

As described above, if the guard process and recalculation of the integral term are performed in a feedback control in which a variable value that temporarily becomes larger than the base gain is set as the feedback gain, the integral term obtained by subtraction may become too small, the input value may become discontinuous, and the approximation of the output value to the target value may be deteriorated on the contrary.

The present invention has been made in view of the above described problem, and has an object to provide a technology that improves the convergence and stability of a feedback control in which a variable value is set as the feedback gain.

To achieve the above-described object, the feedback control system according to the present invention is a feedback control system that sets, as a feedback gain, either a base gain, which has a constant value, or a variable gain, which is a variable value that decays from a value larger than the base gain to a value equal to the base gain, in accordance with a state of a control system and calculates an input value X for a controlled object based on a specific function $f(U_p, U_i)$ having, as variables, at least two terms including a proportional term $U_p$ and an integral term $U_i$, characterized by comprising:

a discriminant value calculation unit for setting, as a discriminant value $X_{id}$, a value $f(U_{pbase}, U_{in})$ obtained by substituting a base proportional term $U_{pbase}$, which is a proportional term calculated using said base gain irrespective of the state of the control system, for the proportional term $U_p$ in said specific function $f(U_p, U_i)$ and substituting a normal integral term $U_{in}$, which is an integral term calculated using a feedback gain that is set in accordance with the state of the control system, for the integral term $U_i$ in said specific function $f(U_p, U_i)$; and an integral term recalculation unit, which performs recalculation of the integral term in cases where said discriminant value $X_{id}$ is larger than a specific first upper limit value $X_{sup}$, for recalculating the integral term so that a value $f(U_{pbase}, U_{ical})$ obtained by substituting said base proportional term $U_{pbase}$ for the proportional term $U_p$ in said specific function $f(U_p, U_i)$ and substituting the recalculated integral term $U_{ical}$ for the integral term $U_i$ in said specific function $f(U_p, U_i)$ becomes equal to or smaller than said first upper limit value $X_{sup}$, wherein in cases where recalculation of the integral term is performed by said integral term recalculation unit, the input value X for the controlled object is set to a value $f(U_{pn}, U_{ical})$ obtained by substituting a normal proportional term $U_{pn}$, which is a proportional term calculated using a feedback gain that is set in accordance with the state of the control system, for the proportional term $U_p$ in said specific function $f(U_p, U_i)$ and substituting said recalculated integral term $U_{ical}$ for the integral term $U_i$ in said specific function $f(U_p, U_i)$.

Thus, in the feedback system according to the present invention, the input value X is set as follows:

(i) when $X_{id}=f(U_{pbase}, U_{in})\leqq X_{sup}$, $$X=f(U_{pn}, U_{in}),\text{ and}$$

(ii) when $X_{id}=f(U_{pbase}, U_{in})>X_{sup}$, $$X=f(U_{pn}, U_{ical}),$$

where $U_{ical}$ satisfies the following condition:

$$f(U_{pbase}, U_{ical})\leqq X_{sup}.$$

Here, the "specific function $f(U_p, U_i)$ having as variables at least two terms including a proportional term $U_p$ and an integral term $U_i$" is, for example, as follows:

in the case of PI control with a normal input value $X_0$, $$f(U_p, U_i)=X_0+U_p+U_i,\text{ and}$$

in the case of PID control, $$f(U_p, U_i)=X_0+U_p+U_i+U_d(U_d\text{: derivative term}).$$

The PI control described before by way of example in the section describing the problem to be solved by the invention corresponds to a case in which "$X_0=0$" holds irrespective of the state of the control system, and the input value X is as follows:

$$X=f(U_p, Ui)=U_p+Ui.$$

The "normal proportional term $U_{pn}$, which is a proportional term calculated using a feedback gain that is set in accordance with the state of the control system" is the base proportional term $U_{pbase}$, namely $U_{pn}=U_{pbase}$, when the state of the control system is a state in which the base gain is set as the feedback gain. On the other hand, when the state of the control system is a state in which the variable gain is set as the feedback gain, the normal proportional term $U_{pn}$ is a variable proportional term $U_{pvar}$, namely $U_{pn}=U_{pvar}$. Here, the variable proportional term $U_{pvar}$ is a proportional term that is calculated using the variable gain.

Similarly, in the case of the integral term, the "normal integral term $U_{in}$, which is an integral term calculated using a feedback gain that is set in accordance with the state of the control system" is the base integral term $U_{ibase}$, namely $U_{in}=U_{ibase}$, when the state of the control system is a state in which the base gain is set as the feedback gain. On the other hand, when the state of the control system is a state in which the variable gain is set as the feedback gain, the normal integral term $U_{in}$ is a variable integral term $U_{ivar}$, namely $U_{in}=U_{ivar}$.

In the feedback control according to the present invention, the discriminant value $X_{id}$ for making a determination as to whether recalculation of the integral term needs to be performed or not is a value calculated separately from the input value X, and the base proportional term $U_{pbase}$ is used as the proportional term thereof irrespective of the state of the control system, namely irrespective of whether the feedback gain is set to the base gain or the variable gain. Therefore, whether recalculation of the integral term is needed or not can be determined accurately without being affected by a steep change in the normal proportional term corresponding to the state of the control system.

For example, even when the state of the control system is a state in which the variable gain is set as the feedback gain, and the value of the variable proportional term $U_{pvar}$ is very large, the discriminant value $X_{id}$ does not have a large value unless the value of the normal integral term $U_{in}$ is too large, and a determination that recalculation of the integral term is needed is not made. Therefore, unnecessary recalculation of the integral term can be prevented from being performed.

If the discriminant value $X_{id}$ is larger than the first upper limit value $X_{sup}$, recalculation of the integral term is performed. The first upper limit value $X_{sup}$ is a value determined based on the upper limit value of the integral term that does not make the integral term calculated in the subsequent feedback control so large that the stability of the feedback control can be deteriorated, and the first upper limit value $X_{sup}$ is predetermined. The first upper limit value $X_{sup}$ may be a constant value that does not depend on the state of the control system or a value determined for every state of the control system.

For example, in the case of PI control in which $f(U_p, U_i)=X_0+U_p+U_i$, the discriminant value $X_{id}$ is as follows:

$$X_{id}=X_0+U_{pbase}+U_{in},$$

and recalculation of the integral term is performed in the following case:

$$X_0+U_{pbase}+U_{in}>X_{sup}.$$

In recalculation of the integral term, the integral term is calculated so that the integral term $U_{ical}$ after the recalculation satisfies the following condition:

$$f(U_{pbase},U_{ical})\leqq X_{sup}.$$

For example, in the case of PI control in which $f(U_p, U_i)=X_0+U_p+U_i$, recalculation of the integral term $U_{ical}$ is performed so that the following condition is satisfied:

$$X_0+U_{pbase}+U_{ical}\leqq X_{sup}.$$

For example, the recalculated integral term $U_{ical}$ is as follows:

$$U_{ical}=X_{sup}-X_0-U_{pbase}.$$

In this way, the base proportional term $U_{pbase}$ is used as the proportional term in recalculation of the integral term irrespective of the state of the control system, namely irrespective of whether the feedback gain is set to the base gain or the variable gain. Therefore, the integral term can be recalculated without being affected by a steep change in the normal proportional term $U_{pn}$ corresponding to the state of the control system, and the recalculated integral term can be prevented from having an unduly small value.

For example, even when the state of the control system is a state in which the variable gain is set as the feedback gain, and the value of the variable proportional term $U_{pvar}$ is very large, the recalculated integral term $U_{ical}$ can be prevented from having an unduly small value.

In the case where recalculation of the integral term is performed, the input value X for the controlled object is calculated as follows:

$$X=f(U_{pn},U_{ical}).$$

Since the input value is calculated based on the integral term $U_{ical}$ recalculated in the above-described way, the input value is prevented from having an unduly small value.

For example, in the case of PI control in which $f(U_p, U_i)=X_0+U_p+U_i$, the input value X in the case where recalculation of the integral term is performed is as follows:

$$X=X_0+U_{pn}+U_{ical}.$$

As described above, in the feedback control of the present invention, even if recalculation of the integral term is performed when the variable gain is used as the feedback gain, the calculated input value is prevented from having an unduly small value, and therefore, the output value is unlikely to change away from the set point, and the convergence and stability of the feedback control can be improved.

In the above-described feedback control system according to the present invention, the discriminant value $X_{id}$ and the recalculated integral term $U_{ical}$ are calculated based on a function $f(U_p, U_i)$ for calculating the input value X from the proportional term $U_p$ and the integral term $U_i$. In particular, in the case of a feedback control system performing a PI control, the discriminant value and the recalculated integral term may be calculated based on the sum of the proportional term $U_p$ and the integral term $U_i$, namely $U_p+U_i$.

Specifically, the feedback control system according to the present invention may be a feedback control system that sets, as a feedback gain, either a base gain, which has a constant value, or a variable gain, which is a variable value that decays from a value larger than the base gain to a value equal to the base gain, in accordance with a state of a control system and calculates an input value for a controlled object based on the sum of a proportional term $U_p$ and an integral term $U_i$, characterized by comprising:

a discriminant value calculation unit for setting, as a discriminant value $X_{id2}$, the sum of a base proportional term $U_{pbase}$, which is a proportional term calculated using said base gain irrespective of the state of the control system and a normal integral term $U_{in}$, which is an integral term calculated using a feedback gain that is set in accordance with the state of the control system; and an integral term recalculation unit, which performs recalculation of the integral term in cases where said discriminant value $X_{id2}$ is larger than a specific second upper limit value $X_{sup2}$, for recalculating the integral term so that the recalculated integral term $U_{ical}$ has a value equal to or smaller than a value obtained by subtracting said base proportional term $U_{pbase}$ from said second upper limit value $X_{sup2}$, wherein in cases where recalculation of the integral term is performed by said integral term recalculation unit, the input value for the controlled object is calculated based on the sum of a normal proportional term $U_{pn}$, which is a proportional term calculated using a feedback gain that is set in accordance with the state of the control system and said recalculated integral term $U_{ical}$.

Thus, in this feedback control system, the input value X is set as follows:

(i) when $X_{id2}=U_{pbase}+U_{in}\leqq X_{sup2}$, $$X=U_{pn}+U_{in}, \text{ and}$$

(ii) when $X_{id2}=U_{pbase}+U_{in}>X_{sup2}$, $$X=U_{pn}+U_{ical},$$

where $U_{ical}$ satisfies the following condition:

$$U_{pbase}+U_{ical}\leqq X_{sup2}.$$

In this configuration, the discriminant value $X_{id2}$ used in determining whether or not recalculation of the integral term needs to be performed is calculated as the sum of the base proportional term $U_{pbase}$ and the normal integral term $U_{in}$, i.e. $U_{pbase}+U_{in}$, irrespective of the state of the control system, namely irrespective of whether the feedback gain is set to the base gain or the variable gain. Therefore, whether recalculation of the integral term is needed or not can be determined accurately without being affected by a steep change in the normal proportional term corresponding to the state of the control system.

For example, even when the state of the control system is a state in which the variable gain is set as the feedback gain, and the value of the variable proportional term $U_{pvar}$ is very large, the discriminant value $X_{id2}$ *does not have a large value unless the value of the normal integral term* $U_{in}$ *is too large, and a determination that recalculation of the integral term is needed is not made. Therefore, unnecessary recalculation of the integral term can be prevented from being performed.*

If the discriminant value $X_{id}$ is larger than the second upper limit value $X_{sup2}$, namely, if $U_{pbase}+U_{in}>X_{sup2}$, recalculation of the integral term is performed. The second upper limit value $X_{sup2}$ is a value determined based on the upper limit value of the integral term that does not make the integral term calculated in the subsequent feedback control so large that the stability of the feedback control can be deteriorated, and the second upper limit value $X_{sup2}$ is predetermined. The second upper limit value $X_{sup2}$ may be a constant value that does not depend on the state of the control system or a value determined for every state of the control system.

In recalculation of the integral term, the integral term is calculated so that the integral term $U_{ical}$ after the recalculation satisfies the following condition:

$$U_{pbase}+U_{ical}\leqq X_{sup2}.$$

For example, the recalculated integral term $U_{ical}$ is as follows:

$$U_{ical}=X_{sup2}-U_{pbase}.$$

In this way, the base proportional term $U_{pbase}$ is used as the proportional term in recalculation of the integral term irrespective of the state of the control system, namely irrespective of whether the feedback gain is set to the base gain or the variable gain. Therefore, the integral term can be recalculated without being affected by a steep change in the normal proportional term $U_{pn}$ corresponding to the state of the control system, and the recalculated integral term can be prevented from having an unduly small value.

For example, even when the state of the control system is a state in which the variable gain is set as the feedback gain, and the value of the variable proportional term $U_{pvar}$ is very large, the recalculated integral term $U_{ical}$ can be prevented from having an unduly small value.

In cases where recalculation of the integral term is performed, since the input value for the controlled object is calculated based on the integral term $U_{ical}$ recalculated in the above-described way, the input value is prevented from having an unduly small value.

Therefore, even if recalculation of the integral term is performed when the variable gain is used as the feedback gain, the calculated input value is prevented from having an unduly small value. In consequence, the output value is unlikely to change away from the set point, and the convergence and stability of the feedback control can be improved.

In the present invention, when the calculated input value is larger than a specific third upper limit value $X_{sup3}$, the input value for the controlled object may be set to a specific value equal to or smaller than the third upper limit value.

By performing such a guard process for the input value, an unduly large input value is prevented from being input to the controlled object, and hunting and overshooting can be prevented from occurring. The guard process for the input value is performed independently from the above-described determination as to whether or not recalculation of the integral term needs to be performed. For example, there may be cases where while recalculation of the integral term is performed, the guard process for the input value is not performed. There may also be cases, conversely, where while recalculation of the integral term is not performed, the guard process for the input value is performed. In this way, according to the present invention, since the determination as to whether or not recalculation of the integral term needs to be performed and the determination as to the guard process for the input value are made independently from each other, the recalculated integral term and the input value for the controlled object can both be calculated as appropriate values.

Here, the third upper limit value $X_{sup3}$ may be determined based on the upper limit of input values that do not cause hunting or overshooting when input to the controlled object. The third upper limit value $X_{sup3}$ is a reference value that is used to determined whether or not the guard process for the input value needs to be performed, and it is a value that is set separately from the aforementioned first upper limit value $X_{sup}$ and the second upper limit value $X_{sup2}$, which are reference values used to determine whether or not recalculation of the integral term needs to be performed. However, they may be set to be equal to each other for the sake of simplicity.

An input value at a stage before the above-described guard process is performed will be hereinafter referred to as a "provisional input value" and represented by $X_d$ in some cases. In such cases, an "input value" will mean a value that is actually input to the controlled object after the guard process has been performed.

In the case where the above-described guard process is performed in the feedback control system according to the aforementioned first invention, (i) when recalculation of the integral term is not performed, namely when the discriminant value $X_{id}$ satisfies the following:

$$X_{id}=f(U_{pbase},U_{in})\leqq X_{sup},$$

the provisional input value $X_d$ is calculated by $$X_d = f(U_{pn}, U_{in}),$$

and (a) if $X_d \leqq X_{sup3}$, the input value X is as follows:

$$X = X_d = f(U_{pn}, U_{in}), \text{ and}$$

(b) if $X_d > X_{sup3}$, the input value X is as follows:

$$X = X_{sup3},$$

on the other hand, (ii) when recalculation of the integral term is performed, namely, when the discriminant value $X_{id}$ satisfies the following:

$$X_{id} = f(U_{pbase}, U_{in}) > X_{sup},$$

the provisional input value $X_d$ is calculated by $$X_d = f(U_{pn}, U_{ical}),$$

and (a) if $X_d \leqq X_{sup3}$, the input value X is as follows:

$$X = X_d = f(U_{pn}, U_{ical}), \text{ and}$$

(b) if $X_d > X_{sup3}$, the input value X is as follows:

$$X = X_{sup3}.$$

In the case where the above-described guard process is performed in the feedback control system according to the aforementioned second invention, (i) when recalculation of the integral term is not performed, namely when the discriminant value $X_{id2}$ satisfies the following:

$$X_{id2} = U_{pbase} + U_{in} \leqq X_{sup2},$$

the provisional input value $X_d$ is calculated based on $U_{pn}+U_{in}$, and (a) if $X_d$ $X_{sup3}$, the input value X is as follows:

$$X = X_d, \text{ and}$$

(b) if $X_d > X_{sup3}$, the input value X is as follows:

$$X = X_{sup3},$$

on the other hand, (ii) when recalculation of the integral term is performed, namely, when the discriminant value $X_{id2}$ satisfies the following:

$$X_{id2} = U_{pbase} + U_{in} > X_{sup2},$$

the provisional input value $X_d$ is calculated based on $U_{pn}+U_{ical}$, and (a) if $X_d \leqq X_{sup3}$, the input value X is as follows:

$$X = X_d, \text{ and}$$

(b) if $X_d > X_{sup3}$, the input value X is as follows:

$$X = X_{sup3}.$$

In the foregoing, the guard process with respect to the upper limit value according to the present invention in the case where the discriminant value or the input value is larger than the upper limit value has been described, the present invention can also be applied in the same way to the guard process with respect to the lower limit value.

When applied to the guard process with respect to the lower limit, the present invention provides a feedback control system that sets, as a feedback gain, either a base gain, which has a constant value, or a variable gain, which is a variable value that decays from a value larger than the base gain to a value equal to the base gain, in accordance with a state of a control system and calculates an input value for a controlled object based on a specific function having, as variables, at least two terms including a proportional term and an integral term, characterized by comprising:

a discriminant value calculation unit for setting, as a discriminant value, a value obtained by substituting a base proportional term, which is a proportional term calculated using said base gain irrespective of the state of the control system, for the proportional term in said specific function and substituting a normal integral term, which is an integral term calculated using a feedback gain that is set in accordance with the state of the control system, for the integral term in said specific function; and an integral term recalculation unit, which performs recalculation of the integral term in cases where said discriminant value is smaller than a specific first lower limit value, for recalculating the integral term so that a value obtained by substituting said base proportional term for the proportional term in said specific function and substituting the recalculated integral term for the integral term in said specific function becomes equal to or larger than said first lower limit value, wherein in cases where recalculation of the integral term is performed by said integral term recalculation unit, the input value for the controlled object is set to a value obtained by substituting a normal proportional term, which is a proportional term calculated using a feedback gain that is set in accordance with the state of the control system, for the proportional term in said specific function and substituting said recalculated integral term for the integral term in said specific function.

In particular, in the case of a feedback control system that performs a PI control, the present invention provides a feedback control system that sets, as a feedback gain, either a base gain, which has a constant value, or a variable gain, which is a variable value that decays from a value larger than the base gain to a value equal to the base gain, in accordance with a state of a control system and calculates an input value for a controlled object based on the sum of a proportional term and an integral term, characterized by comprising:

a discriminant value calculation unit for setting, as a discriminant value, the sum of a base proportional term, which is a proportional term calculated using said base gain irrespective of the state of the control system and a normal integral term, which is an integral term calculated using a feedback gain that is set in accordance with the state of the control system; and an integral term recalculation unit, which performs recalculation of the integral term in cases where said discriminant value is smaller than a specific second lower limit value, for recalculating the integral term so that the recalculated integral term has a value equal to or larger than a value obtained by subtracting said base proportional term from said second lower limit value, wherein in cases where recalculation of the integral term is performed by said integral term recalculation unit, the input value for the controlled object is calculated based on the sum of a normal proportional term, which is a proportional term calculated using a feedback gain that is set in accordance with the state of the control system and said recalculated integral term.

In the guard process for the input value, when the input value is smaller than a specific third lower limit value, the input value for the controlled object may be set to a specific value equal to or larger than the third lower limit value.

In the present invention, the feedback gain may be set to the variable gain when the set point changes.

With this feature, approximation of the output value to the set point can be improved. Furthermore, according to the feedback control of the present invention, even in cases where the feedback gain is set to the variable gain, a determination as to whether or not recalculation of the integral term needs to be performed is correctly made, recalculation of the integral term is appropriately performed, and an appropriate input value is obtained by calculation. In consequence, the convergence and stability of the feedback gain are prevented from being deteriorated. Therefore, the output value can follow a change in the set point with improved reliability.

The feedback control according to the present invention can be applied to a feedback control of the EGR rate of an internal combustion engine.

Specifically, if the present invention is applied to a feedback control system in which the controlled object is an EGR system of an internal combustion engine, comprising an EGR unit for returning a portion of exhaust gas discharged from the internal combustion engine from an exhaust system of the internal combustion engine to an intake system thereof, an EGR regulation unit for regulating the quantity of exhaust gas returned to said intake system by the EGR unit, and an EGR rate sensing unit for sensing the EGR rate, an operation amount of said EGR regulation unit is used as an input value for the controlled object, the EGR rate is used as an output value from the controlled object, and said EGR regulation unit is controlled in such a way that the EGR rate sensed by said EGR rate sensing unit becomes equal to a specific target EGR rate, the EGR rate of the internal combustion engine can be controlled to the target EGR rate with improved accuracy. Thus, exhaust emissions can further be improved.

The EGR regulation unit may be, for example, an EGR valve, an intake throttle valve, or an exhaust throttle valve. In the case of an EGR system equipped with an EGR valve serving as the EGR regulation unit, the operation amount of the EGR regulation unit is the opening degree of the EGR valve. In the case of an EGR system equipped with an intake throttle valve serving as the EGR regulation unit, the operation amount of the EGR regulation unit is the opening degree of the intake throttle valve. In the case of an EGR system equipped with an exhaust throttle valve serving as the EGR regulation unit, the operation amount of the EGR regulation unit is the opening degree of the exhaust throttle valve.

In cases where the present invention is applied to a feedback control of the EGR rate, the feedback gain may be set to a variable gain when the set point for the EGR rate changes, or when the operation state of the internal combustion engine changes.

The feedback control according to the present invention can be applied to a feedback control of the supercharging pressure of the internal combustion engine.

Specifically, if the present invention is applied to a feedback control system in which the controlled object is a supercharging system of an internal combustion engine, comprising a supercharging unit for supercharging air into the internal combustion engine, a supercharging efficiency regulation unit for regulating a supercharging efficiency of said supercharging unit, and a supercharging pressure sensing unit for sensing a supercharging pressure, an operation amount of said supercharging efficiency regulation unit is used as an input value for the controlled object, the supercharging pressure of said internal combustion engine is used as an output value from the controlled object, and said supercharging efficiency regulation unit is controlled in such a way that the supercharging pressure sensed by said supercharging pressure sensing unit becomes equal to a specific target supercharging pressure, the supercharging pressure of the internal combustion engine can be controlled to the target supercharging pressure with improved accuracy. Thus, the power output and fuel economy etc. of the internal combustion engine can be improved.

The supercharging efficiency regulation unit may be, for example, a variable nozzle in a variable geometry turbocharger. In this case, the operation amount of the supercharging efficiency regulation unit is the nozzle vane opening degree.

THE BEST MODE FOR CARRYING OUT THE INVENTION

In the following, a preferred embodiment of the present invention will be described with reference to the accompanying drawings. The dimensions, materials, shapes and relative arrangements etc. of the components that will be described in connection with this embodiment are not intended to limit the technical scope of the present invention only to them, unless particularly specified.

(Embodiment 1)

This embodiment is an embodiment in which the feedback control system according to the present invention is applied to a control of the EGR rate on an internal combustion engine.

Figure 1:
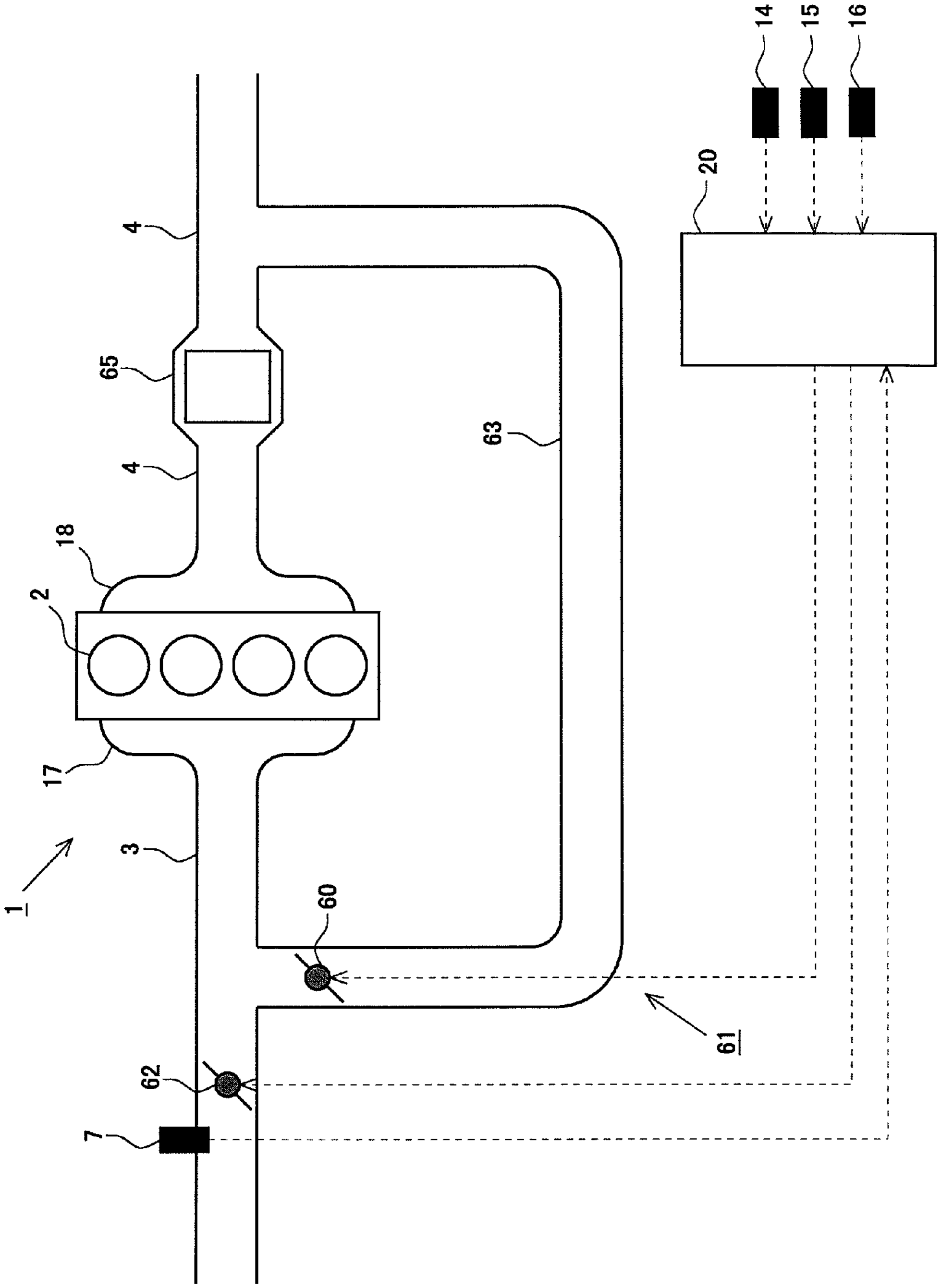
FIG. 1 is a diagram showing the general configuration of an internal combustion engine to which an EGR rate feedback control system according to an embodiment of the present invention is applied and its air-intake and exhaust system.

First, the general configuration of an EGR apparatus of an internal combustion engine according to this embodiment will be described with reference to FIG. 1. The internal combustion engine 1 shown in FIG. 1 is a water-cooled, four-cycle diesel engine having four cylinders 2.

The intake ports (not shown) of the respective cylinders 2 converge into the intake manifold 17 to be in communication with an intake passage 3. An EGR passage 63 that will be described later is connected to the intake passage 3. A throttle valve 62 that regulates the quantity of fresh air flowing in the intake passage 3 is provided in the intake passage 3 upstream of the position at with the EGR passage 63 is connected. An air flow meter 7 that measures the quantity of intake air is provided in the intake passage 3 upstream of the throttle valve 62. Hereinafter, the intake passage 3 and the intake manifold 17 will be collectively referred to as the intake system in some cases.

The exhaust ports (not shown) of the respective cylinders 2 converge into an exhaust manifold 18 to be in communication with an exhaust passage 4. An exhaust gas purification apparatus 65 is provided in the exhaust passage 4. The EGR passage 63 is connected to the exhaust passage 4 downstream of the exhaust gas purification apparatus 65. Hereinafter, the exhaust passage 4 and the exhaust manifold 18 will be collectively referred to as the exhaust system in some cases.

The internal combustion engine 1 is provided with an EGR apparatus 61 that introduces a portion of the exhaust gas flowing in the exhaust passage 4 into the intake passage 3 as EGR gas and returns it back into the internal combustion engine 1. The EGR apparatus 61 includes the EGR passage 63 that connects the exhaust passage 4 downstream of the exhaust gas purification apparatus 65 and the intake passage 3 downstream of the throttle valve 62 and causes a portion of the exhaust gas to flow into the intake passage 3 through the EGR passage 63. In the EGR passage 63 is provided an EGR valve 60 that can regulate the quantity of EGR gas flowing in the EGR passage 63 by varying the flow channel area in the EGR passage 63. The EGR gas quantity can be regulated by adjusting the opening degree of the EGR valve 60.

To the internal combustion engine 1 is annexed an electronic control apparatus (ECU) 20 that controls the internal combustion engine 1. The ECU 20 is a microcomputer equipped with a CPU, ROM, RAM, and input/output ports etc. The ECU 20 is electrically connected with, in addition to the above-mentioned air flow meter 7, sensors such as a water temperature sensor 14 that outputs an electrical signal indicative of the temperature of cooling water circulating in a water jacket of the internal combustion engine 1, an accelerator opening degree sensor 15 that outputs an electrical signal indicative of the depression amount of the accelerator pedal, and a crank position sensor 16 that outputs a pulse signal every time the crankshaft of the internal combustion engine 1 turns by a specific angle (e.g. 10 degrees). The output signals from the sensors are input to the ECU 20. The ECU 20 is also electrically connected with components such as the throttle valve 62 and the EGR valve 60, which are controlled by control signals output from the ECU 20.

ECU 20 obtains the operation state of the internal combustion engine 1 and driver's requests based on the signals input from the aforementioned sensors. For example, the ECU 20 calculates the number of revolutions based on the signal input from the crank position sensor 16, and calculates a requested load based on the signal input from the accelerator opening degree sensor 15. Then, the ECU 20 performs engine controls, such as fuel injection and EGR, in accordance with the number of revolutions and the load thus calculated.

Next, an EGR control in this embodiment will be described. As described before, the EGR control in this embodiment is performed by a feedback control that controls the EGR valve 60 based on an error between the actual EGR rate and a target EGR rate so that the actual EGR rate becomes equal to the specific target EGR rate. In other words, in the feedback control of the EGR rate in this embodiment, the EGR system of the internal combustion engine including the EGR apparatus 61 and the air-intake and exhaust system corresponds to the controlled object in the feedback control system according to the present invention, an opening degree command value sent from the ECU 20 to the EGR valve 60 corresponds to the input value, and the actual EGR rate corresponds to the output value from the controlled object. The actual EGR rate is determined, for example, from the quantity of gas $G_{cyl}$ taken into the cylinders 2 and the quantity of fresh air $G_n$ taken into the intake passage 3 based on the relational expression $(G_{cyl}-G_n)/G_{cyl}$. The target EGR rate is determined by optimizing operations or the like based on values set in regulations of exhaust emissions, and stored in the ROM of the ECU 20 as a constant that is determined according to operation conditions (e.g. the injected fuel quantity and the number of revolutions) of the internal combustion engine 1.

In the following, the feedback control of the EGR rate according to this embodiment will be described with reference to FIG. 2.

Figure 2:
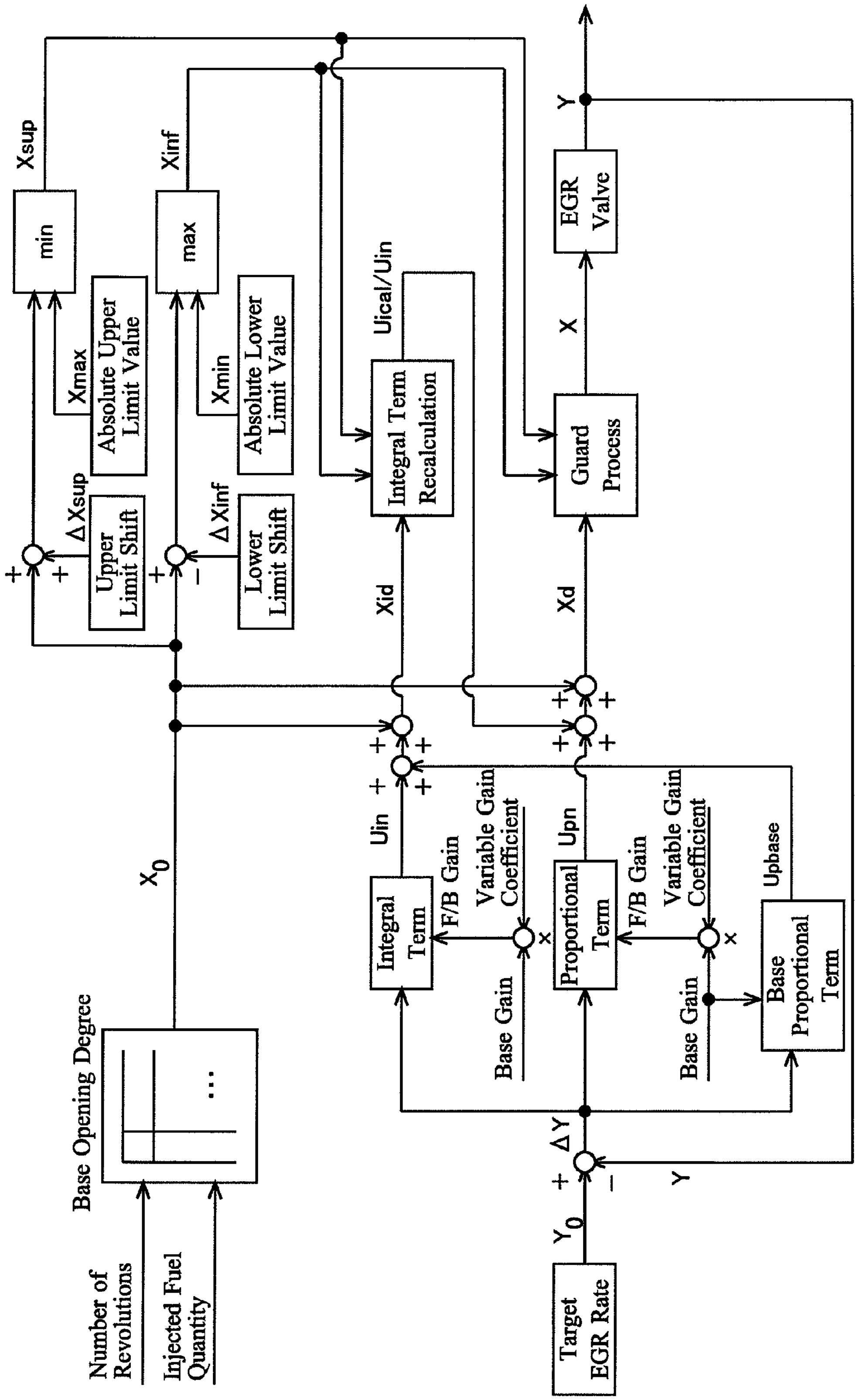
FIG. 2 is a block diagram showing a control logic of the feedback control of the EGR rate according to the embodiment of the present invention.

FIG. 2 is a block diagram showing a control logic of the feedback control of the EGR rate according to this embodiment. As shown in FIG. 2, the feedback control according to this embodiment is a PI control, and the opening degree command value X is basically calculated based on a proportional term that is proportional to the error $\Delta Y(=Y_0-Y)$ between the EGR rate Y and the target EGR rate $Y_0$ and an integral term that is proportional to a time integral of the error $\Delta Y$.

As a feedback gain in calculation of the proportional term and the integral term, a variable value is used. As shown in FIG. 2, the feedback gain is calculated by multiplying a base gain, which is a constant value, by a variable gain coefficient, which is a variable value.

Figure 3:
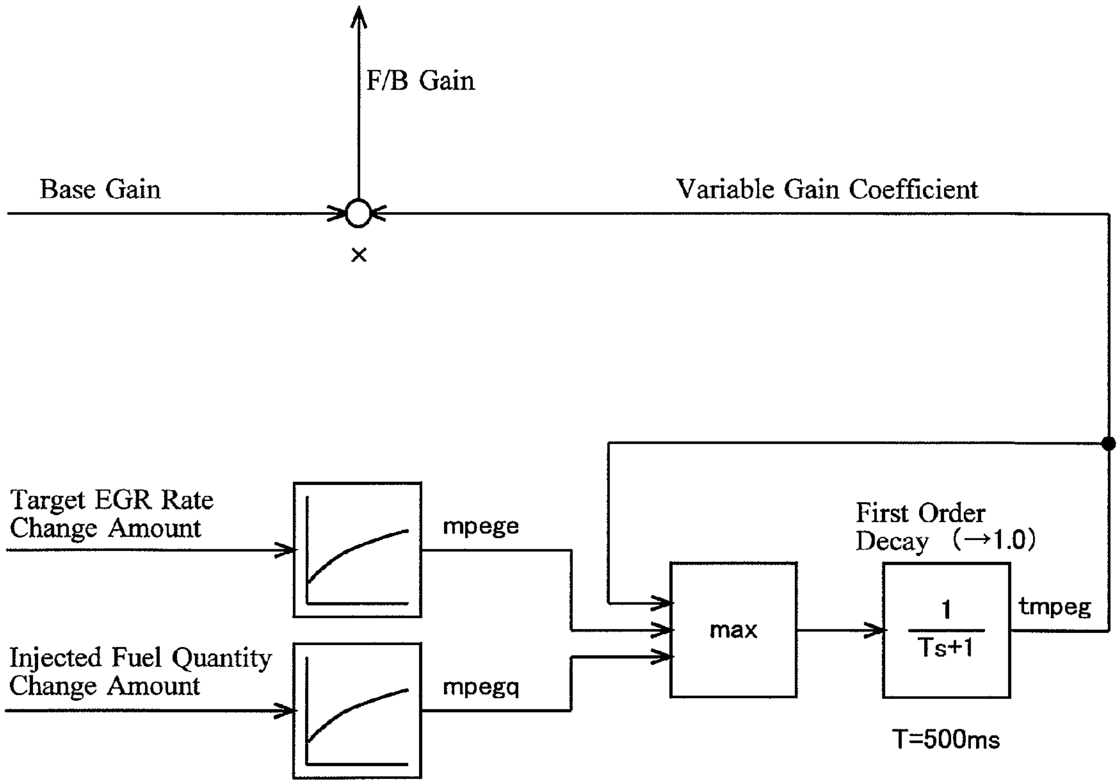
FIG. 3 is a block diagram showing a control logic of a variable feedback gain control in the feedback control of the EGR rate according to the embodiment of the present invention.

FIG. 3 is a block diagram showing an example of a logic of variable control of the feedback gain.

As shown in FIG. 3, when the target EGR rate changes, the variable gain coefficient mpege is calculated in accordance with the amount of change. In addition, when the injected fuel quantity changes, the variable gain coefficient mpegq is calculated in accordance with the amount of change. The larger the amount of changes in the target EGR rate and the injected fuel quantity are, the larger the calculated values of theses variable gain coefficients are. The variable gain coefficient is calculated as a value that has an initial value equal to the largest value among the variable gain coefficient mpege determined in accordance with the amount of change in the target EGR rate, the variable gain coefficient mpegq determined in accordance with the amount of change in the injected fuel quantity, and the variable gain coefficient tmpeg at the time, and decays by a first order process with a time constant T (which is, in this case, 500 ms). The feedback gain is calculated as a value obtained by multiplying the base gain by this variable gain coefficient.

Figure 4:
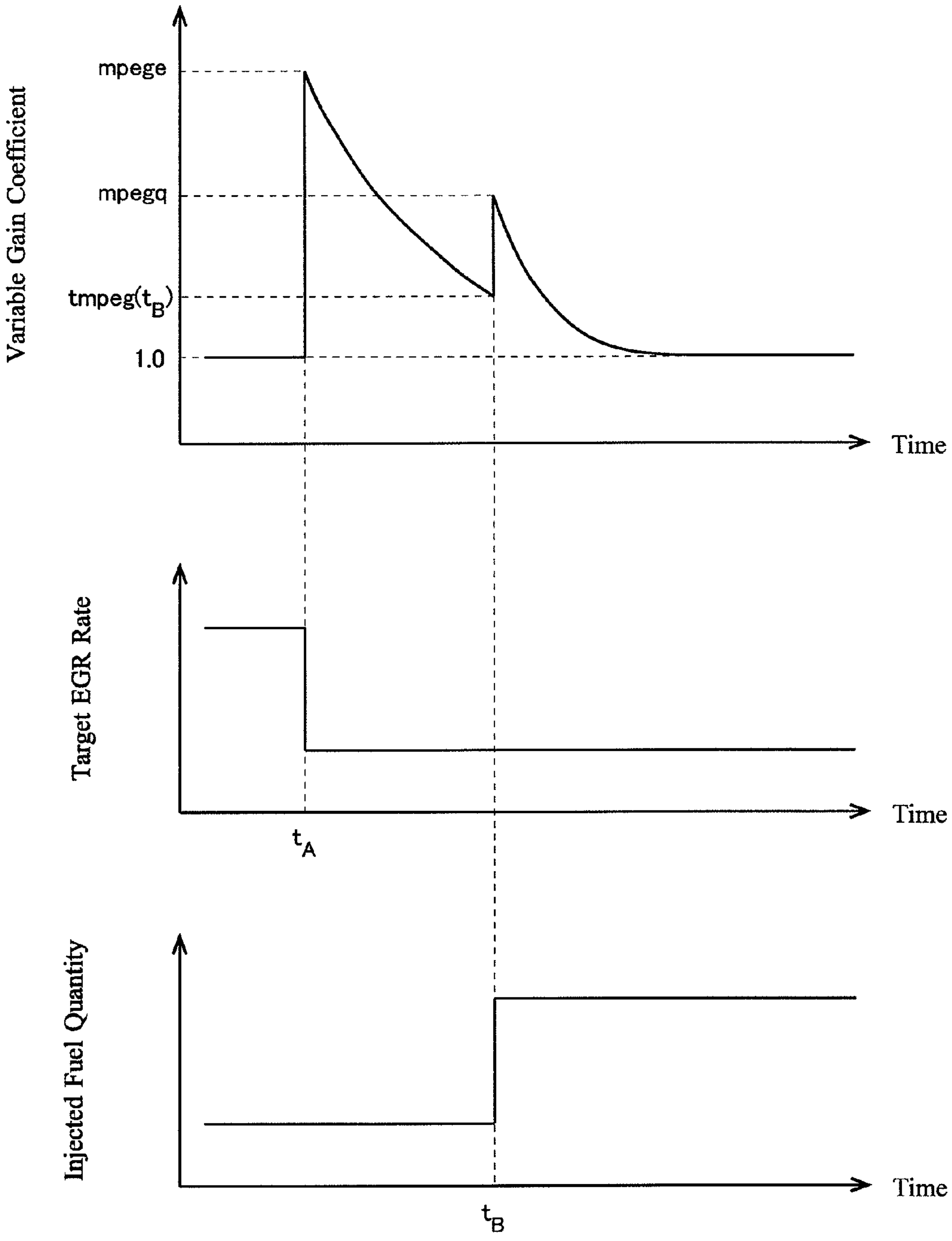
FIG. 4 shows an example of changes in a variable gain coefficient in a case where a variable feedback gain control is performed with a change in the target EGR rate or in the injected fuel quantity in the feedback control of the EGR rate according to the embodiment of the present invention.

FIG. 4 shows an example of changes in the variable gain coefficient with a change in the target EGR rate or the injected fuel quantity.

In FIG. 4, during stationary operation until the target EGR rate changes at time $t_A$, the variable gain coefficient is constant and equal to 1.0. In other words, the feedback gain is set to the base gain. When the target EGR rate changes at time $t_A$, a variable gain coefficient mpege is calculated in accordance with the amount of change, and the variable gain coefficient is set to mpege. After time $t_A$, the variable gain coefficient decays by a first order decay process from this initial value mpege with a time constant of T. Next, when the injected fuel quantity changes at time $t_B$ (>$t_A$), the variable gain coefficient tmpeg ($t_B$) at that time and a variable gain coefficient mpegq determined in accordance with the amount of change in the injected fuel quantity are compared. In this case, since mpegq is larger as shown in the drawing, the variable gain coefficient is set to mpegq. After time $t_B$, the variable gain coefficient decays by a first order decay process from the initial value mpegq with a time constant of T. If the stationary operation state in which neither the target EGR rate nor the injected fuel quantity changes continues over a period sufficiently longer than the time constant T after time $t_B$, the variable gain coefficient decays to 1.0, whereby the feedback gain becomes equal to the base gain.

As described above, according to the variable feedback gain control in this embodiment, the feedback gain is set to the base gain having a constant value during stationary operation in which neither the target EGR rate nor the injected fuel quantity changes. When the target EGR rate or the injected fuel quantity changes, a variable value that decays from a value larger than the base gain with a time constant of T is used as the feedback gain. This enables an improvement in the approximation of the actual EGR rate to the target EGR rate at a time when the target EGR rate or the injected fuel quantity changes.

Although in the case shown in FIGS. 3 and 4 a change in the target EGR rate or in the injected fuel quantity is taken as an example of conditions for setting a feedback gain having a variable value, a feedback gain having a variable value may be set in response to a change in other parameter(s) associated with a change in the operation sate of the internal combustion engine 1. The target EGR rate and the operation state of the internal combustion engine in the feedback control in this embodiment correspond to the "state of the control system" according to which the feedback gain is set to the base gain or the variable gain. In the following, "the target EGR rate and the operation state of the internal combustion engine", which serve as conditions according to which whether the feedback gain is set to the base gain or the variable gain is determined, will be collectively referred to as "the state of the EGR control system" in some cases.

The proportional term calculated using the feedback gain that is set in accordance with this "state of the EGR control system" will be hereinafter referred to as the "normal proportional term $U_{pn}$". In cases where the state of the EGR control system is a state in which the base gain is set as the feedback gain (i.e. in cases where stationary operation state has continued for a time sufficiently longer than the decay time constant of the variable gain coefficient since a change in the state of the EGR control system), the normal proportional term $U_{pn}$ is equal to a base proportional term $U_{pbase}$, which is a proportional term calculated using the base gain, namely $U_{pn}=U_{pbase}$. In cases where the state of the EGR control system is a state in which a variable gain is set as the feedback gain (i.e. in cases where stationary operation state has not continued for a time sufficiently longer than the decay time constant of the variable gain coefficient since a change in the state of the EGR control system), the normal proportional term $U_{pn}$ is equal to a variable proportional term $U_{pvar}$, which is a proportional term calculated using the variable gain, namely $U_{pn}=U_{pvar}$.

In the case of the integral term also, the integral term that is calculated using a feedback gain that is set in accordance with the state of the EGR control system will be hereinafter referred to as the "normal integral term $U_{in}$". In cases where the state of the EGR control system is a state in which the base gain is set as the feedback gain, the normal integral term $U_{in}$ is equal to a base integral term $U_{ibase}$, which is an integral term calculated using the base gain, namely $U_{in}=U_{ibase}$. In cases where the state of the EGR control system is a state in which a variable gain is set as the feedback gain, the normal integral term $U_{in}$ is equal to a variable integral term $U_{ivar}$, which is an integral term calculated using the variable gain, namely $U_{in}=U_{ivar}$.

The proportional term and the integral term mentioned in FIG. 2 refer to the above-described normal proportional term $U_{pn}$ and the normal integral term $U_{in}$ respectively.

In the feedback control according to this embodiment, the opening degree command value for the EGR valve 60 is calculated as the sum of the normal proportional term $U_{pn}$, the normal integral term $U_{in}$ (or the integral term $U_{ical}$ after recalculation, in cases where recalculation of the integral term that will be described later is executed), and a base opening degree $X_0$. Here, the base opening degree $X_0$ is a opening degree of the EGR valve 60 that makes the EGR rate in a certain operation state of the internal combustion engine equal to a target EGR rate that is determined in accordance with the operation state, the base opening degree $X_0$ being obtained, by optimizing operations or the like, as a constant that is determined for every operation state of the internal combustion engine (that is, in this case, the number of revolutions and the injected fuel quantity) and stored in the ROM of the ECU 20.

In the feedback control according to this embodiment, when the opening degree command value that is calculated as a input value for the EGR valve 60 becomes larger than a specific upper limit $X_{sup}$ (or becomes smaller than a specific lower limit value $X_{inf}$), a guard process that limits the opening degree command value actually input to the EGR valve 60 to the upper limit value $X_{sup}$ (or the lower limit value $X_{inf}$). Hereinafter, the opening degree command value at a stage before the guard process is performed will be referred to as the "provisional opening degree command value" and represented by $X_d$. The final opening degree command value after the guard process has been performed will be represented by X. By performing the guard process, if the provisional opening degree command value $X_d$ is larger than the upper limit value $X_{sup}$, the final opening degree command value X is set to the upper limit value $X_{sup}$. If the provisional opening degree command value $X_d$ is smaller than the lower limit value $X_{inf}$, the final opening degree command value X is set to the lower limit value $X_{inf}$. If the provisional opening degree command value $X_d$ is not smaller than the lower limit value $X_{inf}$ and not larger than the upper limit value $X_{sup}$, the provisional opening degree command value $X_d$ is set as the final opening degree command value X without a change.

By performing this guard process, the opening degree command value X input to the EGR valve 60 is prevented from becoming too large (or too small), whereby hunting and overshooting can be prevented from occurring, and the stability of the feedback control is improved.

As shown in FIG. 2, the upper limit value $X_{sup}$ in the guard process is set to the sum of the base opening degree $X_0$ and an upper limit shift $\Delta X_{sup}$ ($X_0+\Delta X_{sup}$) or an absolute upper limit value $X_{max}$, whichever is the smaller, namely $X_{sup}=\min(X_0+\Delta X_{sup}, X_{max})$.

On the other hand, the lower limit value $X_{inf}$ is set to the difference of the base opening degree $X_0$ and a lower limit shift $\Delta X_{inf}$ ($X_0-\Delta X_{inf}$) or an absolute lower limit value $X_{min}$, whichever is the larger, namely $X_{inf}=\max(X_0-\Delta X_{inf}, X_{min})$.

Here, the upper limit shift $\Delta X_{sup}$, the lower limit shift $\Delta X_{inf}$, the absolute upper limit value $X_{max}$, and the absolute lower limit value $X_{min}$ will be described. The EGR valve opening degree that makes the EGR rate equal to the target EGR rate is determined in advance as the base opening degree $X_0$ as described above. However, the actual EGR valve opening degree at which the EGR rate becomes equal to the target EGR rate varies in a range having a certain breadth around the base opening degree $X_0$ due to manufacturing variations of the EGR valves, deteriorations of the EGR system (including the EGR valve, the intake and exhaust passages, and the EGR passage etc.), and/or changes of the EGR system with time etc. The upper limit shift $\Delta X_{sup}$ and the lower limit shift $\Delta X_{inf}$ correspond to this breadth of the range around the base opening degree $X_0$. The absolute upper limit value $X_{max}$ and the absolute lower limit value $X_{min}$ refer to opening degrees that are impossible to be realized due to the specifications of the EGR valve 60 or physically impossible (e.g. an opening degree larger than that in the fully opened state and an opening degree smaller than that in the fully closed state).

Figure 5:
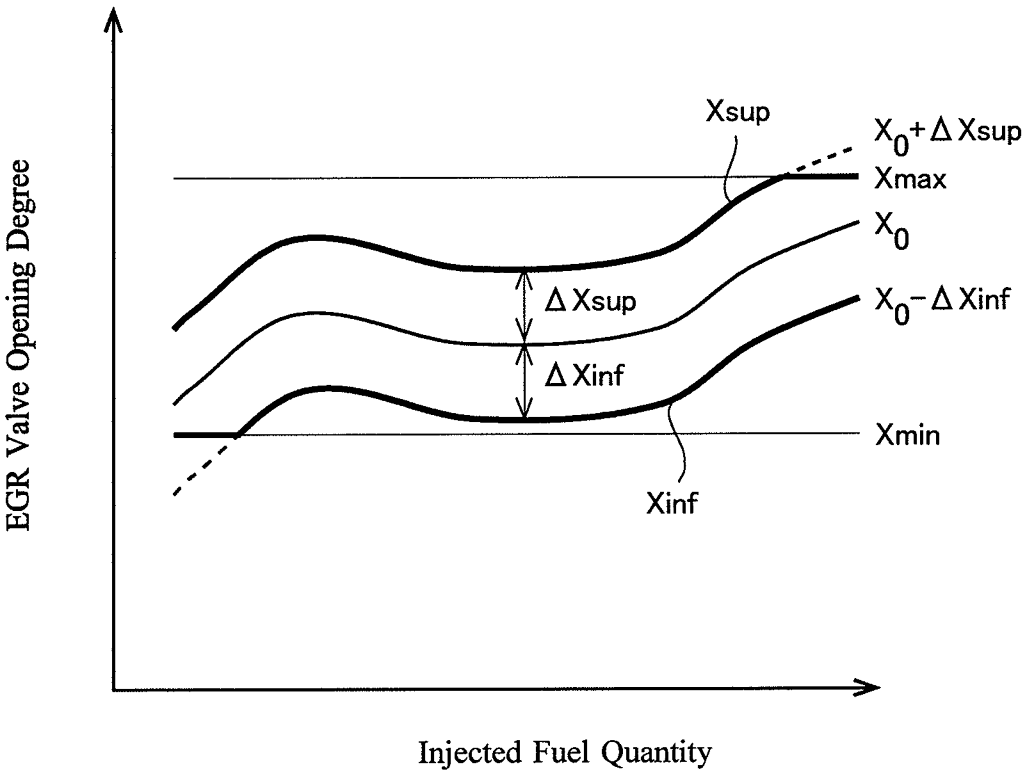
FIG. 5 schematically shows a relationship among a base opening degree of the EGR valve opening degree, an upper limit value, and a lower limit value in the feedback control of the EGR rate according to the embodiment of the present invention.

FIG. 5 schematically shows the upper limit value $X_{sup}$ and the lower limit value $X_{inf}$ determined in this way. In FIG. 5, the horizontal axis represents the injected fuel quantity, and the vertical axis represents the opening degree of the EGR valve, where the base opening degree $X_0$ is represented as a function of the injected fuel quantity for the sake of simplicity. As shown in FIG. 5, a band of range is defined around the base opening degree $X_0$ by the upper limit shift $\Delta X_{sup}$ and the lower limit shift $\Delta X_{inf}$. Furthermore, a range of values that the EGR valve opening degree can assume is limited by the absolute upper limit value $X_{max}$ and the absolute lower limit value $X_{min}$. The smaller one of the value larger than the base opening degree $X_0$ by the upper limit shift $\Delta X_{sup}$ and the absolute upper limit value $X_{max}$ is set as the upper limit value $X_{sup}$ (the upper thick line). On the other hand, the larger one of the value smaller than the base opening degree $X_0$ by the lower limit shift $\Delta X_{inf}$ and the absolute lower limit value $X_{min}$ is set as the lower limit value $X_{inf}$ (the lower thick line).

In cases where the opening degree command value X is limited to the upper limit value $X_{sup}$ (or the lower limit value $X_{inf}$), in other words in cases where the provisional opening degree command value $X_d$ is too large (or too small), it is considered that the proportional term and the integral term are also too large (or too small). If the integral term, among them, is too large (or too small), the stability of the feedback control can be deteriorated, because the value of the integral term at a certain time affects values of the integral term that will be calculated subsequently. In view of this, in the feedback control according to this embodiment, when the integral term becomes too large (or too small), recalculation of the integral term is performed so that the integral term assumes appropriate values subsequently.

Specifically, if a discriminant value $X_{id}$, which is calculated as the sum of the normal integral term $U_{in}$, the base proportional term $U_{pbase}$, and the base opening degree $X_0$, namely $X_{id}=X_0+U_{pbase}+U_{in}$ as shown in FIG. 2, exceeds the range defined by the upper limit value $X_{sup}$ and the lower limit value $X_{inf}$ used in the above-described guard process, recalculation of the integral term is performed.

Here, as the proportional term in the equation for calculating the discriminant value $X_{id}$, the base proportional term $U_{pbase}$ is always used irrespective of the state of the EGR control system. Therefore, in cases where the state of the EGR control system is a state in which the base gain is set as the feedback gain, the discriminant value $X_{id}$ is calculated as $X_{id}=X_0+U_{pbase}+U_{ibase}$. On the other hand, in cases where the state of the EGR control system is a state in which a variable gain is set as the feedback gain, the discriminant value $X_{id}$ is calculated as $X_{id}=X_0+U_{pbase}+U_{ivar}$.

The reason why the base proportional term $U_{pbase}$ is used rather than the normal proportional term $U_{pn}$ as the proportional term in calculating the discriminant value $X_{id}$ is as follows. As shown in FIG. 4, the value of the variable gain soon after a change in the state of the EGR control system is very large, and accordingly the normal proportional term $U_{pn}$ calculated at this time (which is equal to the variable proportional term $U_{pvar}$, in this case) also has a very large value. In such a case, if the normal proportional term $U_{pn}$ is used as the proportional term in calculating the discriminant value $X_{id}$, the discriminant value $X_{id}$ may exceed the upper limit value $X_{sup}$ (or the lower limit value $X_{inf}$) even when the value of the integral term is not so large that recalculation is needed, and consequently recalculation that is not needed in reality may be performed. In contrast to this, if the base proportional term $U_{pbase}$ is always used as the proportional term in calculating the discriminant value $X_{id}$ irrespective of the state of the EGR control system as is the case with this embodiment, whether recalculation of the integral term is needed or not can be accurately discriminated without being affected by a steep change in the value of the normal proportional term $U_{pn}$.

Specifically, the integral term is recalculated so that the sum of the base proportional term $U_{pbase}$, the integral term after recalculation (which will be hereinafter referred to as the recalculated integral term) $U_{ical}$ and the base opening degree $X_0$ becomes equal to the upper limit value $X_{sup}$ (or $X_{inf}$). Thus, in cases where the discriminant value $X_{id}$ is larger than the upper limit value $X_{sup}$, the recalculated integral term $U_{ical}$ is calculated as follows:

$$U_{ical}=X_{sup}-X_0-U_{pbase}.$$

On the other hand, in cases where the discriminant value $X_{id}$ is smaller than the lower limit value $X_{inf}$, the recalculated integral term $U_{ical}$ is calculated as follows:

$$U_{ical}=X_{inf}-X_0-U_{pbase}.$$

In this way, in recalculating the integral term, the base proportional term $U_{pbase}$ is always used as the proportional term to be subtracted from the upper limit value $X_{sup}$ (or the lower limit value $X_{inf}$), irrespective of the state of the EGR control system. In other words, the recalculated integral term $U_{ical}$ is calculated based on the value obtained by subtracting the base proportional portion $U_{pbase}$ from the upper limit value $X_{sup}$ (or the lower limit value $X_{inf}$), whether the state of the EGR control system is a state in which the base gain is set as the feedback gain or a state in which the variable gain is set as the feedback gain.

This is because, as described above, the normal proportional term $U_{pn}$ soon after a change in the state of the EGR control system may have a very large value in some cases, and in such cases, if the integral term is recalculated by subtracting the normal proportional term $U_{pn}$ from the upper limit value $X_{sup}$ (or the lower limit value $X_{inf}$), the value of the recalculated integral term $U_{ical}$ can be unduly small. If the value of the recalculated integral term $U_{ical}$ is unduly small, values of the integral term calculated subsequently in the feedback control are affected thereby to become unduly small. In consequence, an appropriate opening command value is not calculated, and the EGR opening degree may be controlled in a direction that does not decrease the error between actual EGR rate and the target EGR rate. In contrast to this, if the base proportional term $U_{pbase}$ is always used as the proportional term portion in recalculating the integral term irrespective of the state of the EGR control system as with this embodiment, an appropriate value of the recalculated integral term $U_{ical}$ can be obtained by calculation without being affected by a steep change in the value of the normal proportional term $U_{pn}$.

In cases where recalculation of the integral term is performed, the provisional opening degree command value $X_d$ is calculated as the sum of the normal proportional term $U_{pn}$, the recalculated integral term $U_{ical}$, and the base opening degree $X_0$, namely $X_d=X_0+U_{pn}+U_{ical}$. On the other hand, in cases where recalculation of the integral term is not performed, in other words in cases where the discriminant value $X_{id}$ satisfies $X_{inf}\leqq X_{id}\leqq X_{sup}$, the provisional opening degree command value $X_d$ is calculated as the sum of the normal proportional term $U_{pn}$, the normal integral term $U_{in}$, and the base opening degree $X_0$, namely $X_d=X_0+U_{pn}+U_{in}$. The above-described guard process is performed for the provisional opening degree command value $X_d$ thus calculated, and then the final opening degree command value X is calculated.

In this embodiment, the upper limit value $X_{sup}$ and the lower limit value $X_{inf}$ used in the guard process for the opening degree command value are used as the upper limit value and the lower limit value of the discriminant value $X_{id}$ in determining whether recalculation of the integral term needs to be performed or not. However, these two processes need not have common upper and lower limit values.

An example of the guard process and recalculation of the integral term in the feedback control of the EGR rate according to the above-described embodiment will be described with reference to FIGS. 6 and 7.

Figure 6:
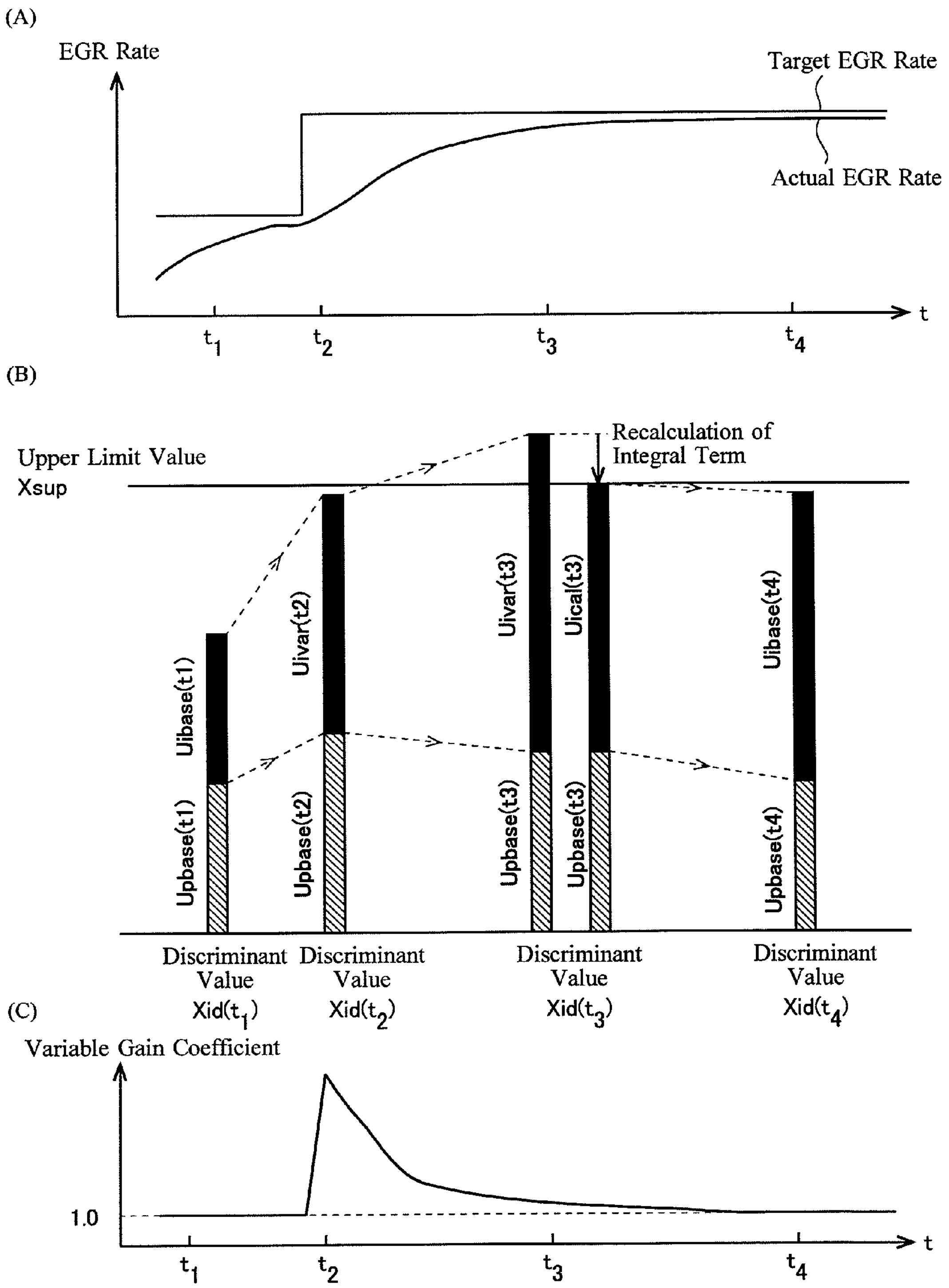
FIG. 6 shows a change in the discriminant value and an example of recalculation of the integral term in a case where the feedback control of the EGR rate according to the embodiment of the present invention is performed.
Figure 9:
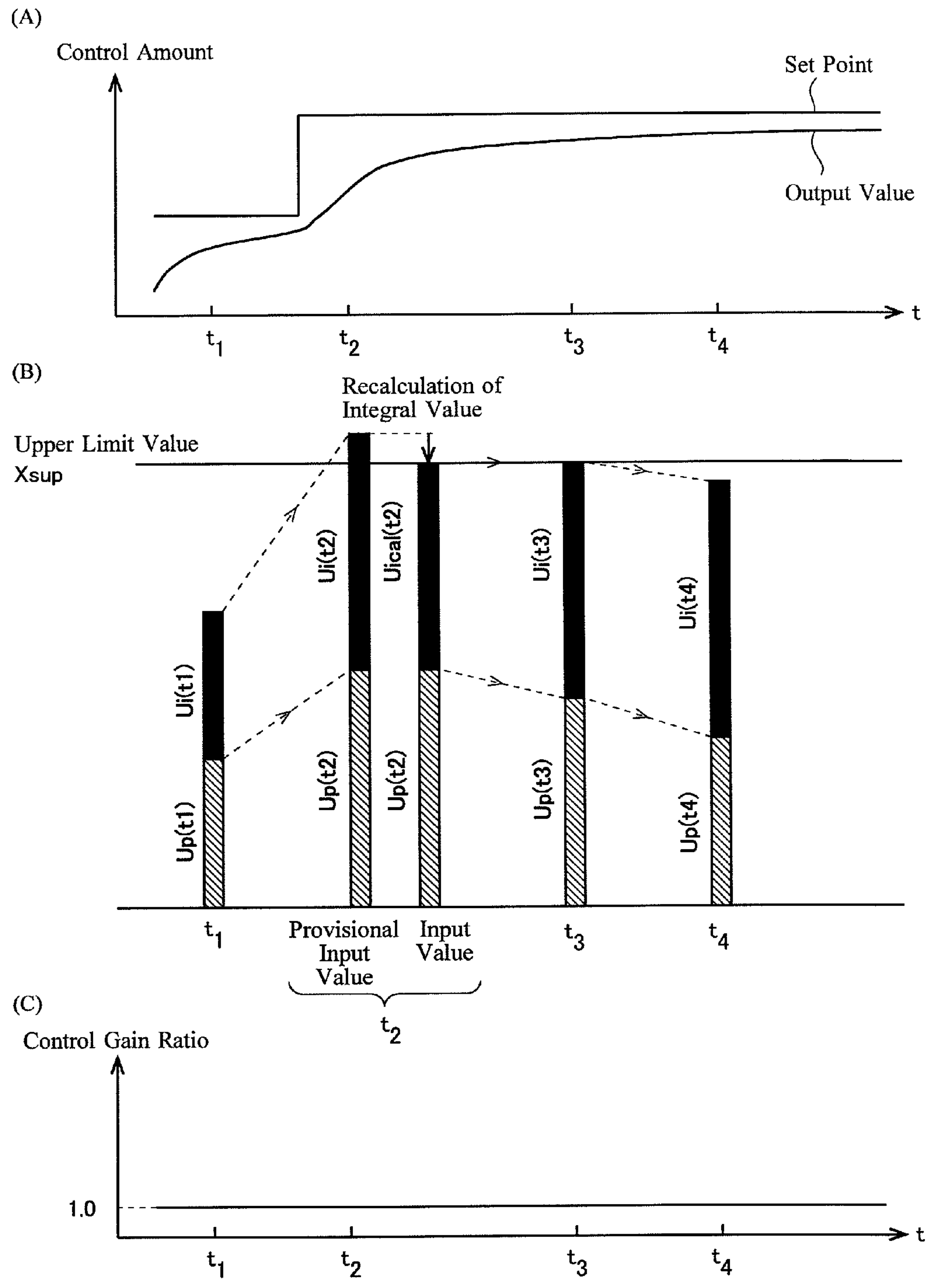
FIG. 9 shows a change in an input value and an example of recalculation of an integral term in a conventional feedback control.
Figure 10:
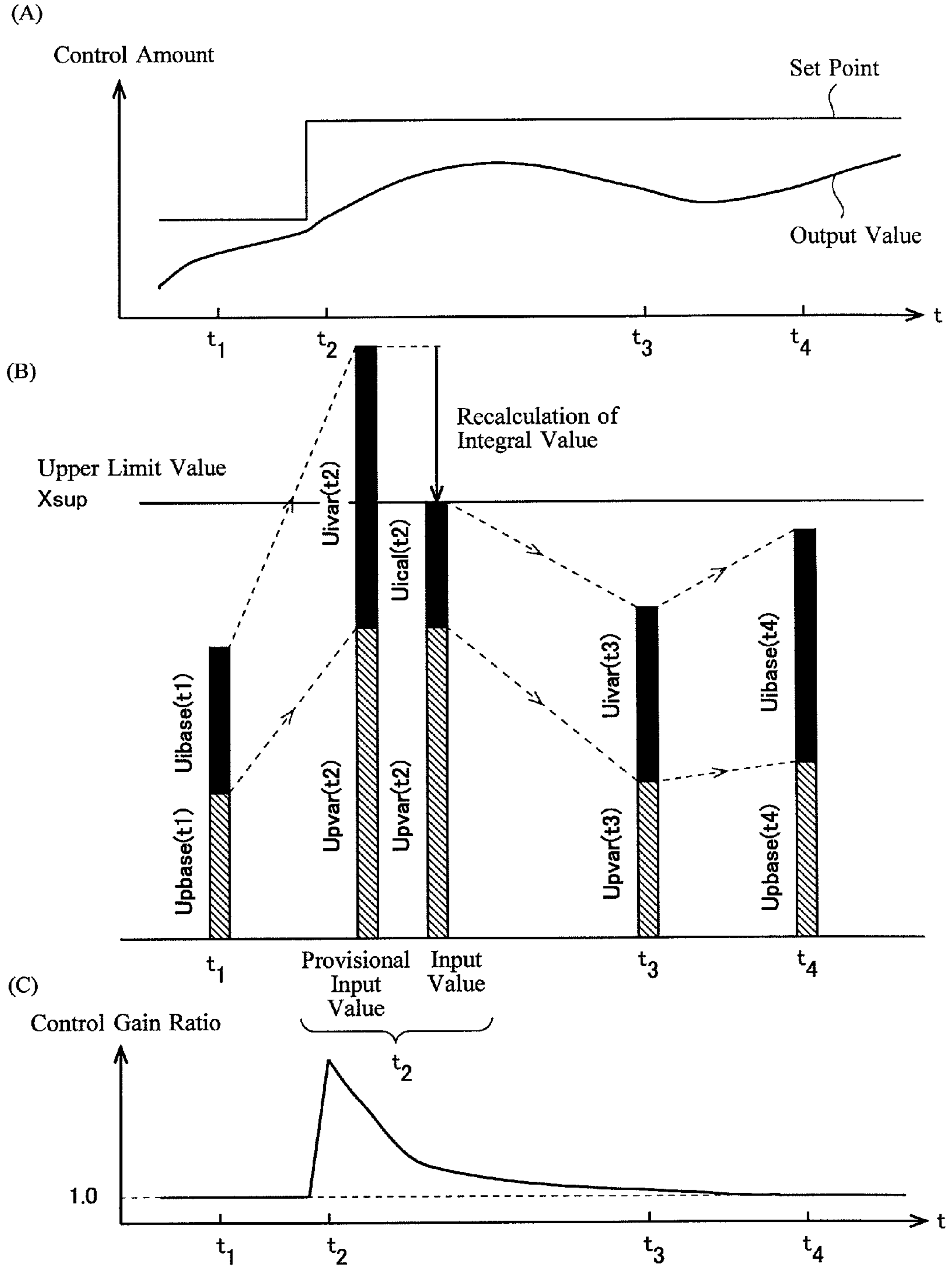
FIG. 10 shows a change in an input value and an example of recalculation of an integral term in a conventional feedback control.

FIG. 6 schematically shows an example of recalculation of the integral term. FIG. 6(A) is a graph showing changes in the target EGR rate and the actual EGR rate. FIG. 6(B) is a diagram showing changes in the discriminant value $X_{id}$ and recalculation of the integral term. The hatched portions represent the proportional term, and the solid black portions represent the integral term. In FIG. 6, in order to enable comparison with FIGS. 9 and 10 referred to in the section describing the problem to be solved by the invention described before, the term of the base opening degree $X_0$ in calculation of the discriminant value $X_{id}$ and recalculation of the integral term is omitted, and it is assumed that the discriminant value $X_{id}$ is calculated as the sum of the base proportional term $U_{pbase}$ and the normal integral term $U_{in}$. In addition, it is assumed that the recalculated integral term $U_{ical}$ is calculated by subtracting the base proportional term $U_{pbase}$ from the upper limit value $X_{sup}$. This may be considered to be a particular case of the feedback control of the EGR rate according to this embodiment in which the base opening degree $X_0$ is constantly equal to zero. FIG. 6(C) is a graph showing changes in the variable gain coefficient.

Figure 7:
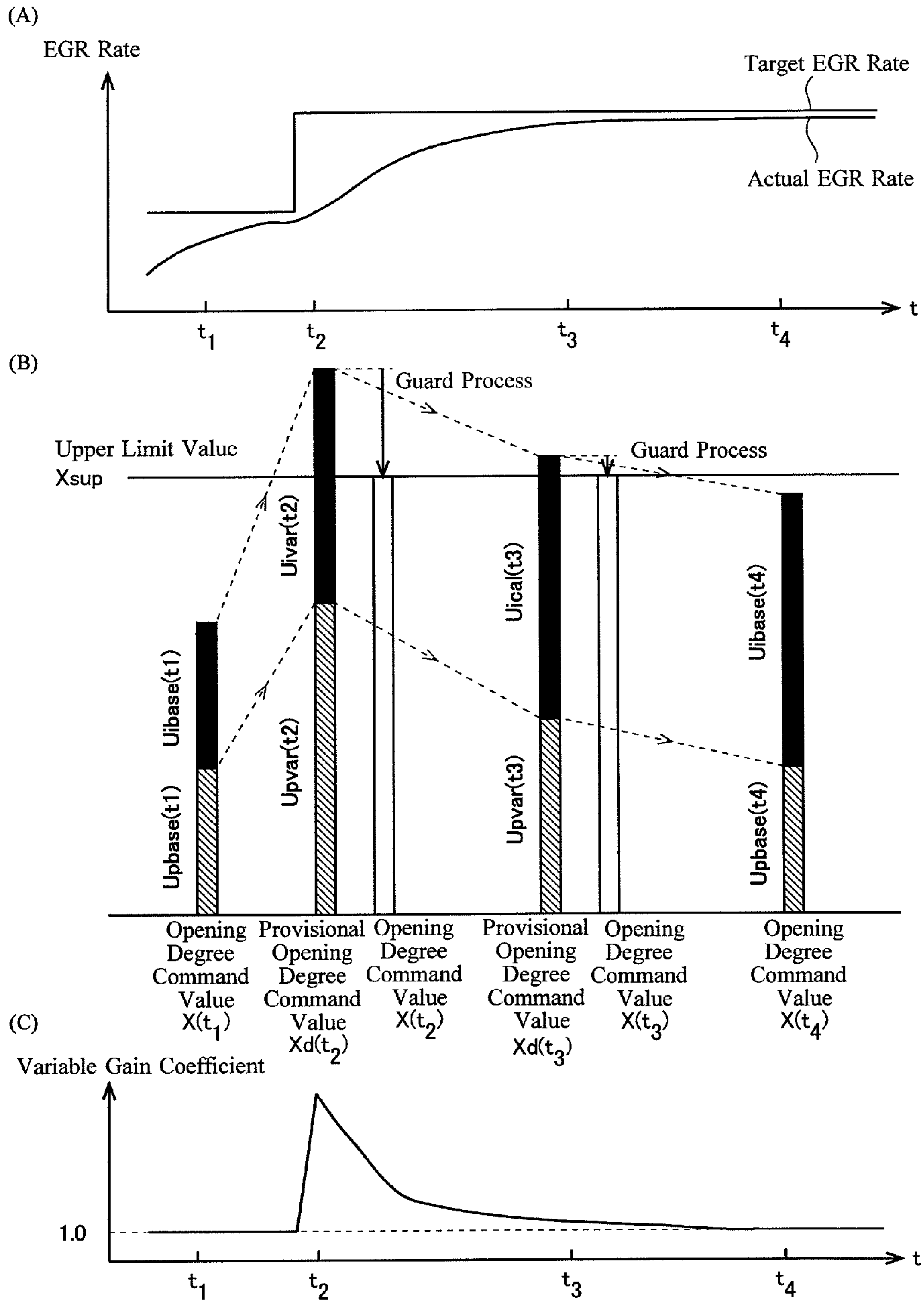
FIG. 7 shows changes in a provisional opening degree command value and an opening degree command value and an example of guard process in a case where the feedback control of the EGR rate according to the embodiment of the present invention is performed.

FIG. 7 schematically shows an example of the guard process for the opening degree command value. FIGS. 7(A) and 7(C) are equivalent to FIGS. 6(A) and 6(C) respectively. FIG. 7(B) shows changes in the provisional opening degree command value $X_d$ and the opening degree command value X and an exemplary calculation in the guard process. As with FIG. 6, the term of the base opening degree $X_0$ in calculation of the provisional opening degree command value $X_d$ and calculation of the opening degree command value X is omitted, and it is assumed that the provisional opening degree command value $X_d$ is calculated as the sum of the normal proportional term $U_{pn}$ and the normal integral term $U_{in}$ or the recalculated integral term $U_{ical}$.

The state of the EGR control system at time $t_1$ is a stationary state as shown in FIG. 6(A), and the discriminant value $X_{id}$ is calculated as the sum of the base proportional term $U_{pbase}$ and the normal integral term $U_{in}$ (which is, in this case, the base integral term $U_{ibase}$), namely $X_{id}(t_1)=U_{pbase}(t_1)+U_{ibase}(t_1)$. Since $X_{id}(t_i)\leqq X_{sup}$, as shown in FIG. 6(B), recalculation of the integral term is not performed. Therefore, as shown in FIG. 7(B), the provisional opening degree command value $X_d$ is calculated as the sum of the normal proportional term $U_{pn}$ (which is, in this case, the base proportional term $U_{pbase}$) and the normal integral term $U_{in}$ (which is, in this case, the base integral term $U_{ibase}$), namely $X_d(t_1)=U_{pbase}(t_1)+U_{ibase}(t_1)$. Since $X_d(t_1)\leqq X_{sup}$, as shown in FIG. 7(B), the guard process is not performed. Therefore, the provisional opening degree command value is set as the opening degree command value without a change, namely $X(t_1)=X_d(t_1)$.

When the target EGR rate changes at a time between time $t_1$ and time $t_2$ as shown in FIG. 6(A), the variable gain coefficient changes in a manner shown in FIG. 6(C), and the feedback gain is set to the variable gain. Therefore, the discriminant value $X_{id}$ at time $t_2$ is calculated as the sum of the base proportional term $U_{pbase}$ and the normal integral term $U_{in}$ (which is, in this case, the variable integral term $U_{ivar}$), namely $X_{id}(t_2)=U_{pbase}(t_2)+U_{ivar}(t_2)$. Since $X_{id}(t_2)\leqq X_{sup}$, as shown in FIG. 6(B), recalculation of the integral term is not performed. Therefore, as shown in FIG. 7(B), the provisional opening degree command value $X_d$ is calculated as the sum of the normal proportional term $U_{pn}$ (which is, in this case, the variable proportional term $U_{pvar}$) and the normal integral term $U_{in}$ (which is, in this case, the variable integral term $U_{ivar}$), namely $X_d(t_2)=U_{pvar}(t_2)+U_{ivar}(t_2)$. Since $X_d(t_2)>X_{sup}$, as shown in FIG. 7(B), the guard process is performed. Therefore, the opening degree command value is set to the upper limit value, namely $X(t_2)=X_{sup}$.

At time $t_3$, the feedback gain is the variable gain as shown in FIG. 6(C), and the discriminant value $X_{id}$ is calculated as the sum of the base proportional term $U_{pbase}$ and the normal integral term $U_{in}$ (which is, in this case, the variable integral term $U_{ivar}$), namely $X_{id}(t_3)=U_{pbase}(t_3)+U_{ivar}(t_3)$. Since $X_{id}(t_3)>X_{sup}$, as shown in FIG. 6(B), recalculation of the integral term is performed. The recalculated integral term $U_{ical}$ is calculated by subtracting the base proportional term $U_{pbase}(t_3)$ from the upper limit value $X_{sup}$, namely $U_{ical}(t_3)=X_{sup}-U_{pbase}(t_3)$. Therefore, as shown in FIG. 7(B), the provisional opening degree command value $X_d$ is calculated as the sum of the normal proportional term $U_{pn}$ (which is, in this case, the variable proportional term $U_{pvar}$) and the recalculated integral term $U_{ical}$, namely $X_d(t_3)=U_{pvar}(t_3)+U_{ical}(t_3)$. Since $X_d(t_3)>X_{sup}$, as shown in FIG. 7(B), the guard process is performed. Therefore, the opening degree command value is set to the upper limit value, namely $X(t_3)=X_{sup}$.

At time $t_4$, the feedback gain is the base gain as shown in FIG. 6(*c*), and the discriminant value $X_{id}$ is calculated as the sum of the base proportional term $U_{pbase}$ and the normal integral term $U_{in}$ (which is, in this case, the base integral term $U_{ibase}$), namely $X_{id}(t_4)=U_{pbase}(t_4)+U_{ibase}(t_4)$. Since $X_{id}(t_4)\leqq X_{sup}$, as shown in FIG. 6(B), recalculation of the integral term is not performed. Therefore, as shown in FIG. 7(B) the provisional opening degree command value $X_d$ is calculated as the sum of the normal proportional term $U_{pn}$ (which is, in this case, the base proportional term $U_{pbase}$) and the normal integral term $U_{in}$ (which is, in this case, the base integral term $U_{ibase}$), namely $X_d(t_4)=U_{pbase}(t_4)+U_{ibase}(t_4)$. Since $X_d(t_4)\leqq X_{sup}$, as shown in FIG. 7(B), the guard process is not performed. Therefore, the provisional opening degree command value is set as the opening degree command value without a change, namely $X(t_4)=X_d(t_4)$.

As described above, according to the feedback control of the EGR rate according to this embodiment, as shown in FIG. 6(A), even in cases where the variable gain is set as the feedback gain, the actual EGR rate does not change away from the target EGR rate, but the actual EGR rate can approach the target EGR rate with improved reliability.

Figure 8:
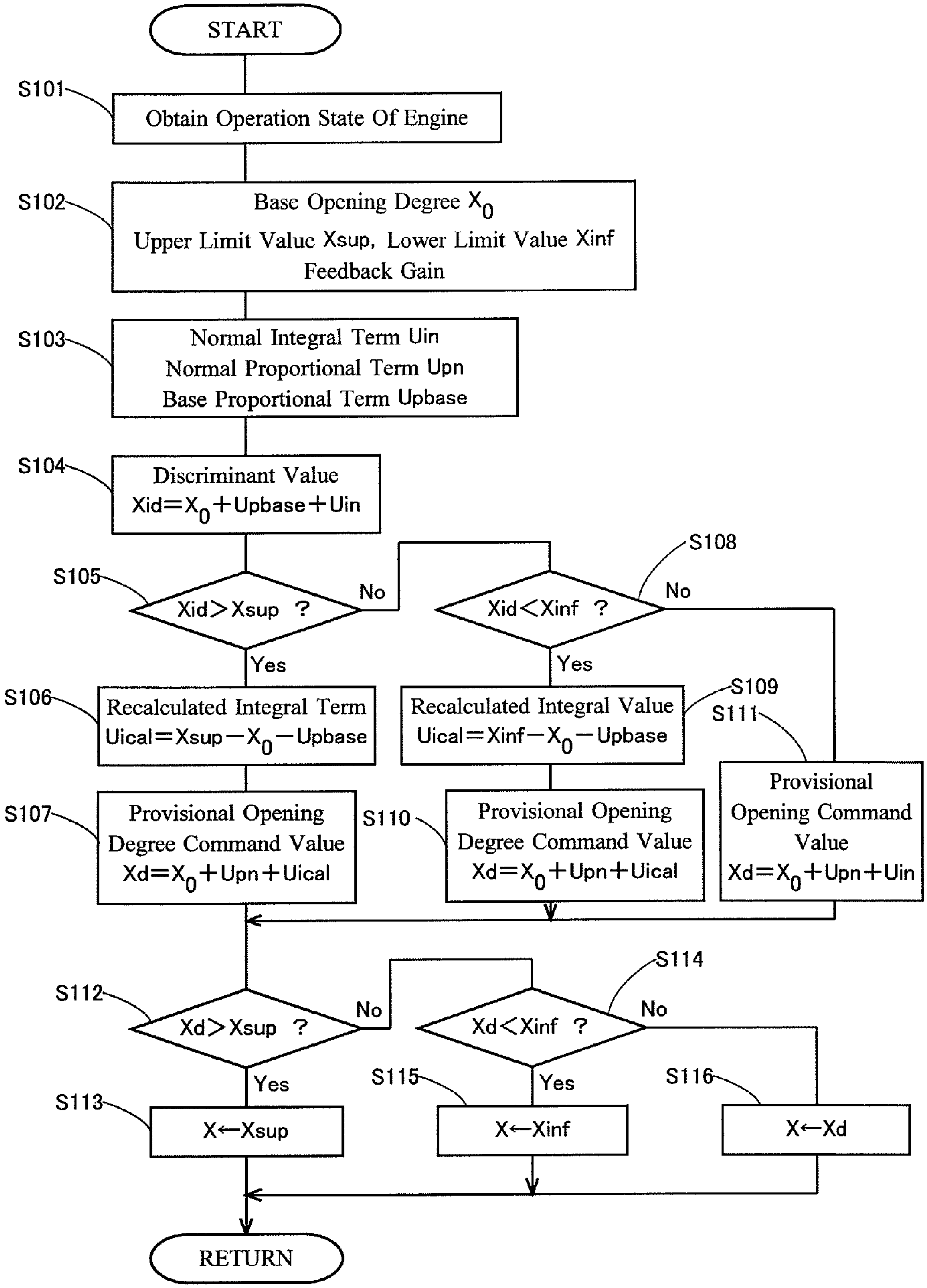
FIG. 8 is a flow chart of a routine of a feedback control of the EGR rate according to the embodiment of the present invention.

Here, the process of executing the feedback control of the EGR rate according to this embodiment will be described based on FIG. 8. FIG. 8 is a flow chart of the EGR rate feedback control routine according to this embodiment. This routine is executed by the ECU 20 repeatedly at predetermined intervals during operation of the internal combustion engine 1.

First in step S101, the ECU 20 obtains the operation state of the internal combustion engine 1. For example, the ECU 20 obtains the number of revolutions and the injected fuel quantity as parameters representing the operation state.

Then, in step S102, the ECU 20 calculates the base opening degree $X_0$, the upper limit value $X_{sup}$, and the lower limit value $X_{inf}$ of the EGR valve opening degree, and the feedback gain, in accordance with the operation state obtained in step S101.

In step S103, the ECU 20 calculates the normal proportional term $U_{pn}$ and the normal integral term $U_{in}$ using the feedback gain calculated in step S102, and calculates the base proportional term $U_{pbase}$.

In step S104, the ECU 20 calculates the discriminant value $X_{id}$ ($X_{id}=X_0+U_{pbase}+U_{in}$).

In step S105, the ECU 20 makes a determination as to whether or not the discriminant value $X_{id}$ calculated in step S104 is larger than the upper limit value $X_{sup}$. If the determination in step S105 is affirmative, the ECU 20 proceeds to step S106. On the other hand, if the determination in step S105 is negative, the ECU 20 proceeds to step S108.

In step S106, the ECU 20 performs recalculation of the integral term to obtain the recalculated integral term $U_{ical}$ ($U_{ical}=X_{sup}-X_0-U_{pbase}$).

In step S107, the ECU 20 calculates the provisional opening degree command value $X_d$ based on the normal proportional term $U_{pn}$ calculated in step S103 and the recalculated integral term $U_{ical}$ calculated in step S106 ($X_d=X_0+U_{pn}+U_{ical}$).

In step S108, the ECU 20 makes a determination as to whether or not the discriminant value $X_{id}$ calculated in step S104 is smaller than the lower limit value $X_{inf}$. If the determination in step S108 is affirmative, the ECU 20 proceeds to step S109. On the other hand, if the determination in step S108 is negative, the ECU 20 proceeds to step S111.

In step S109, the ECU 20 performs recalculation of the integral term to obtain the recalculated integral term $U_{ical}$ ($U_{ical}=X_{inf}-X_0-U_{pbase}$).

In step S110, the ECU 20 calculates the provisional opening degree command value $X_d$ based on the normal proportional term $U_{pn}$ calculated in step S103 and the recalculated integral term $U_{ical}$ calculated in step S109 ($X_d=X_0+U_{pn}+U_{ical}$).

In step S111, the ECU 20 calculates the provisional opening degree command value $X_d$ based on the normal proportional term $U_{pn}$ and the normal integral term $U_{in}$ calculated in step S103 ($X_d=X_0+U_{pn}+U_{in}$).

In step S112, the ECU 20 makes a determination as to whether or not the provisional opening degree command value $X_d$ calculated in step S107, S110, or S111 is larger than the upper limit value $X_{sup}$. If the determination in step S112 is affirmative, the ECU 20 proceeds to step S113. On the other hand, if the determination in step S112 is negative, the ECU 20 proceeds to step S114.

In step S113, the ECU 20 sets the opening degree command value X to the upper limit value $X_{sup}$.

In step S114, the ECU 20 makes a determination as to whether or not the provisional opening degree command value $X_d$ calculated in step S107, S110, or S111 is smaller than the lower limit value $X_{inf}$. If the determination in step S114 is affirmative, the ECU 20 proceeds to step S115. On the other hand, if the determination in step S114 is negative, the ECU 20 proceeds to step S116.

In step S115, the ECU 20 set the opening degree command value X to the lower limit value $X_{inf}$.

In step S116, the ECU 20 sets the opening degree command value X to the provisional opening degree command value $X_d$.

After completion of step S113, S115, or S116, the ECU 20 once terminates execution of this routine.

In this embodiment, the ECU 20 that executes step S104 corresponds to the discriminant value calculation unit in the present invention. The ECU 20 that executes step S106 or S109 corresponds to the integral term recalculation unit in the present invention.

The embodiment described in the foregoing is an example for explaining the present invention, and various modifications can be made to the above-described embodiment without departing from the essence of the present invention. For example, while in the above-described embodiment, the feedback control system according to the present invention is applied to the feedback control of the EGR rate of an internal combustion engine, it may be applied to other feedback control in general. Furthermore, although in the above-described embodiment, a case in which a PI control is performed as the feedback control has been described, the present invention can also be applied to cases where a PID control is performed.

Industrial Applicability

The present invention can achieve improvements in convergence and stability of a feedback control that uses a variable gain as the feedback gain.

The invention claimed is:

1. A feedback control system that sets, as a feedback gain, either a base gain, which has a constant value, or a variable gain, which is a variable value that decays from a value larger than the base gain to a value equal to the base gain, in accordance with a state of a control system and calculates an input value for a controlled object based on a specific function having, as variables, at least two terms including a proportional term and an integral term, characterized by comprising:

a discriminant value calculation unit for setting, as a discriminant value, a value obtained by substituting a base proportional term, which is a proportional term calculated using said base gain irrespective of the state of the control system, for the proportional term in said specific function and substituting a normal integral term, which is an integral term calculated using a feedback gain that is set in accordance with the state of the control system, for the integral term in said specific function; and an integral term recalculation unit, which performs recalculation of the integral term in cases where said discriminant value is larger than a specific first upper limit value, for recalculating the integral term so that a value obtained by substituting said base proportional term for the proportional term in said specific function and substituting the recalculated integral term for the integral term in said specific function becomes equal to or smaller than said first upper limit value, wherein in cases where recalculation of the integral term is performed by said integral term recalculation unit, the input value for the controlled object is set to a value obtained by substituting a normal proportional term, which is a proportional term calculated using a feedback gain that is set in accordance with the state of the control system, for the proportional term in said specific function and substituting said recalculated integral term for the integral term in said specific function.

2. A feedback control system that sets, as a feedback gain, either a base gain, which has a constant value, or a variable gain, which is a variable value that decays from a value larger than the base gain to a value equal to the base gain, in accordance with a state of a control system and calculates an input value for a controlled object based on a sum of a proportional term and an integral term, characterized by comprising:

a discriminant value calculation unit for setting, as a discriminant value, a sum of a base proportional term, which is a proportional term calculated using said base gain irrespective of the state of the control system and a normal integral term, which is an integral term calculated using a feedback gain that is set in accordance with the state of the control system; and an integral term recalculation unit, which performs recalculation of the integral term in cases where said discriminant value is larger than a specific second upper limit value, for recalculating the integral term so that the recalculated integral term has a value equal to or smaller than a value obtained by subtracting said base proportional term from said second upper limit value, wherein in cases where recalculation of the integral term is performed by said integral term recalculation unit, the input value for the controlled object is calculated based on a sum of a normal proportional term, which is a proportional term calculated using a feedback gain that is set in accordance with the state of the control system and said recalculated integral term.

3. A feedback control system according to claim 1, characterized in that in cases where the input value is larger than a specific third upper limit value, the input value for the controlled object is set to a specific value equal to or smaller than the third upper limit value.

4. A feedback control system that sets, as a feedback gain, either a base gain, which has a constant value, or a variable gain, which is a variable value that decays from a value larger than the base gain to a value equal to the base gain, in accordance with a state of a control system and calculates an input value for a controlled object based on a specific function having, as variables, at least two terms including a proportional term and an integral term, characterized by comprising:

a discriminant value calculation unit for setting, as a discriminant value, a value obtained by substituting a base proportional term, which is a proportional term calculated using said base gain irrespective of the state of the control system, for the proportional term in said specific function and substituting a normal integral term, which is an integral term calculated using a feedback gain that is set in accordance with the state of the control system, for the integral term in said specific function; and an integral term recalculation unit, which performs recalculation of the integral term in cases where said discriminant value is smaller than a specific first lower limit value, for recalculating the integral term so that a value obtained by substituting said base proportional term for the proportional term in said specific function and substituting the recalculated integral term for the integral term in said specific function becomes equal to or larger than said first lower limit value, wherein in cases where recalculation of the integral term is performed by said integral term recalculation unit, the input value for the controlled object is set to a value obtained by substituting a normal proportional term, which is a proportional term calculated using a feedback gain that is set in accordance with the state of the control system, for the proportional term in said specific function and substituting said recalculated integral term for the integral term in said specific function.

5. A feedback control system that sets, as a feedback gain, either a base gain, which has a constant value, or a variable gain, which is a variable value that decays from a value larger than the base gain to a value equal to the base gain, in accordance with a state of a control system and calculates an input value for a controlled object based on a sum of a proportional term and an integral term, characterized by comprising:

a discriminant value calculation unit for setting, as a discriminant value, a sum of a base proportional term, which is a proportional term calculated using said base gain irrespective of the state of the control system and a normal integral term, which is an integral term calculated using a feedback gain that is set in accordance with the state of the control system; and an integral term recalculation unit, which performs recalculation of the integral term in cases where said discriminant value is smaller than a specific second lower limit value, for recalculating the integral term so that the recalculated integral term has a value equal to or larger than a value obtained by subtracting said base proportional term from said second lower limit value, wherein in cases where recalculation of the integral term is performed by said integral term recalculation unit, the input value for the controlled object is calculated based on a sum of a normal proportional term, which is a proportional term calculated using a feedback gain that is set in accordance with the state of the control system and said recalculated integral term.

6. A feedback control system according to claim 4, characterized in that in cases where the input value is smaller than a specific third lower limit value, the input value for the controlled object is set to a specific value equal to or larger than the third lower limit value.

7. A feedback control system according to claim 1 characterized in that the feedback gain is set to the variable gain when a set point changes.

8. A feedback control system according to claim 3, characterized in that the feedback gain is set to the variable gain when a set point changes.

9. A feedback control system according to claim 6, characterized in that the feedback gain is set to the variable gain when a set point changes.

10. A feedback control system according to claim 1, characterized in that, said controlled object is an EGR system of an internal combustion engine, comprising an EGR unit for returning a portion of exhaust gas discharged from the internal combustion engine from an exhaust system to an intake system, an EGR regulation unit for regulating the quantity of exhaust gas returned to said intake system by the EGR unit, and an EGR rate sensing unit for sensing an EGR rate, the input value for said controlled object is an operation amount of said EGR regulation unit, an output value from said controlled object is the EGR rate, and said EGR regulation unit is controlled in such a way that the EGR rate sensed by said EGR rate sensing unit becomes equal to a specific target EGR rate.

11. A feedback control system according to claim 3, characterized in that, said controlled object is an EGR system of an internal combustion engine, comprising an EGR unit for returning a portion of exhaust gas discharged from the internal combustion engine from an exhaust system to an intake system, an EGR regulation unit for regulating the quantity of exhaust gas returned to said intake system by the EGR unit, and an EGR rate sensing unit for sensing an EGR rate, the input value for said controlled object is an operation amount of said EGR regulation unit, an output value from said controlled object is the EGR rate, and said EGR regulation unit is controlled in such a way that the EGR rate sensed by said EGR rate sensing unit becomes equal to a specific target EGR rate.

12. A feedback control system according to claim 6, characterized in that, said controlled object is an EGR system of an internal combustion engine, comprising an EGR unit for returning a portion of exhaust gas discharged from the internal combustion engine from an exhaust system to an intake system, an EGR regulation unit for regulating the quantity of exhaust gas returned to said intake system by the EGR unit, and an EGR rate sensing unit for sensing an EGR rate, the input value for said controlled object is an operation amount of said EGR regulation unit, an output value from said controlled object is the EGR rate, and said EGR regulation unit is controlled in such a way that the EGR rate sensed by said EGR rate sensing unit becomes equal to a specific target EGR rate.

13. A feedback control system according to claim 7, characterized in that, said controlled object is an EGR system of an internal combustion engine, comprising an EGR unit for returning a portion of exhaust gas discharged from the internal combustion engine from an exhaust system to an intake system, an EGR regulation unit for regulating the quantity of exhaust gas returned to said intake system by the EGR unit, and an EGR rate sensing unit for sensing an EGR rate, the input value for said controlled object is an operation amount of said EGR regulation unit, an output value from said controlled object is the EGR rate, and said EGR regulation unit is controlled in such a way that the EGR rate sensed by said EGR rate sensing unit becomes equal to a specific target EGR rate.

14. A feedback control system according to claim 1, characterized in that, said controlled object is a supercharging system of an internal combustion engine, comprising supercharging unit for supercharging air into the internal combustion engine, a supercharging efficiency regulation unit for regulating a supercharging efficiency of the supercharging unit, and a supercharging pressure sensing unit for sensing a supercharging pressure, the input value for said controlled object is an operation amount of said supercharging efficiency regulation unit, an output value from said controlled object is the supercharging pressure, and said supercharging efficiency regulation unit is controlled in such a way that the supercharging pressure sensed by said supercharging pressure sensing unit becomes equal to a specific target supercharging pressure.

15. A feedback control system according to claim 3, characterized in that, said controlled object is a supercharging system of an internal combustion engine, comprising supercharging unit for supercharging air into the internal combustion engine, a supercharging efficiency regulation unit for regulating a supercharging efficiency of the supercharging unit, and a supercharging pressure sensing unit for sensing a supercharging pressure, the input value for said controlled object is an operation amount of said supercharging efficiency regulation unit, an output value from said controlled object is the supercharging pressure, and said supercharging efficiency regulation unit is controlled in such a way that the supercharging pressure sensed by said supercharging pressure sensing unit becomes equal to a specific target supercharging pressure.

16. A feedback control system according to claim 6, characterized in that, said controlled object is a supercharging system of an internal combustion engine, comprising supercharging unit for supercharging air into the internal combustion engine, a supercharging efficiency regulation unit for regulating a supercharging efficiency of the supercharging unit, and a supercharging pressure sensing unit for sensing a supercharging pressure, the input value for said controlled object is an operation amount of said supercharging efficiency regulation unit, an output value from said controlled object is the supercharging pressure, and said supercharging efficiency regulation unit is controlled in such a way that the supercharging pressure sensed by said supercharging pressure sensing unit becomes equal to a specific target supercharging pressure.

17. A feedback control system according to claim 16, characterized in that, said controlled object is a supercharging system of an internal combustion engine, comprising supercharging unit for supercharging air into the internal combustion engine, a supercharging efficiency regulation unit for regulating a supercharging efficiency of the supercharging unit, and a supercharging pressure sensing unit for sensing a supercharging pressure, the input value for said controlled object is an operation amount of said supercharging efficiency regulation unit, an output value from said controlled object is the supercharging pressure, and said supercharging efficiency regulation unit is controlled in such a way that the supercharging pressure sensed by said supercharging pressure sensing unit becomes equal to a specific target supercharging pressure.

* * * * *

UNITED STATES PATENT AND TRADEMARK OFFICE

CERTIFICATE OF CORRECTION

PATENT NO. : 8,489,309 B2
APPLICATION NO. : 12/601424
DATED : July 16, 2013
INVENTOR(S) : Shigeki Nakayama It is certified that error appears in the above-identified patent and that said Letters Patent is hereby corrected as shown below:

In the Claims

In column 26, claim 17, line 43:

line 1: A feedback control system according to claim 16, char-

Delete “16”

Insert --7--

Signed and Sealed this
Eleventh Day of March, 2014

Michelle K. Lee
*Deputy Director of the United States Patent and Trademark Office*